(12) United States Patent
Mizuno

(10) Patent No.: US 11,048,109 B2
(45) Date of Patent: Jun. 29, 2021

(54) DISPLAY MODULE, DISPLAY DEVICE, AND METHOD FOR CONTROLLING SAME

(71) Applicant: CASIO COMPUTER CO., LTD., Tokyo (JP)

(72) Inventor: Kimiyasu Mizuno, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/065,127

(22) PCT Filed: Sep. 13, 2016

(86) PCT No.: PCT/JP2016/077609
§ 371 (c)(1),
(2) Date: Jun. 21, 2018

(87) PCT Pub. No.: WO2017/110175
PCT Pub. Date: Jun. 29, 2017

(65) Prior Publication Data
US 2018/0373078 A1   Dec. 27, 2018

(30) Foreign Application Priority Data
Dec. 22, 2015   (JP) .............................. JP2015-250175

(51) Int. Cl.
*G09G 3/36* (2006.01)
*G02F 1/133* (2006.01)
(Continued)

(52) U.S. Cl.
CPC .... *G02F 1/13306* (2013.01); *G02F 1/133308* (2013.01); *G09G 3/20* (2013.01);
(Continued)

(58) Field of Classification Search
CPC ................. G02F 1/133; G02F 1/13306; G02F 1/133308; G04G 9/0064; G09G 3/20; G09G 3/36; G09G 3/3648; G09G 3/32
See application file for complete search history.

(56) References Cited

U.S. PATENT DOCUMENTS 7,594,054 B2   9/2009   Joos et al.
8,633,887 B2   1/2014   Lim
(Continued)

FOREIGN PATENT DOCUMENTS

| CN | 1744066 A | 3/2006 |
|---|---|---|
| JP | 09331490 A | 12/1997 |

(Continued)

OTHER PUBLICATIONS

International Search Report (ISR) dated Dec. 20, 2016 issued in International Application No. PCT/JP2016/077609.
(Continued)

*Primary Examiner* — Alexander Eisen
*Assistant Examiner* — Cory A Almeida
(74) *Attorney, Agent, or Firm* — Holtz, Holtz & Volek PC

(57) ABSTRACT

A display module, display device, and method for controlling same which can suppress power consumption of an electronic device while providing a user with various types of information by various display methods. The display device is configured with two processors with different processing capacities and, with the processors cooperating mutually, image data is written in a driver circuit of a display section via separate interfaces in accordance with an operation mode. A driver circuit writes pixel data based on the image data in each pixel of a display panel which is a memory characteristic liquid crystal panel for retention, thereby controlling the display form of an image in the display panel.

20 Claims, 11 Drawing Sheets

(a)

(b)

(51) Int. Cl.
*G09G 3/20* (2006.01)
*G02F 1/1333* (2006.01)
*G04G 9/00* (2006.01)

(52) U.S. Cl.
CPC ............ *G09G 3/36* (2013.01); *G09G 3/3648* (2013.01); *G04G 9/0064* (2013.01); *G09G 2300/0857* (2013.01); *G09G 2310/04* (2013.01); *G09G 2340/0435* (2013.01)

(56) References Cited

U.S. PATENT DOCUMENTS

| | | | |
|---|---|---|---|
| 9,436,970 | B2 | 9/2016 | Connell et al. |
| 9,927,865 | B2 | 3/2018 | Heo et al. |
| 2002/0113781 | A1 | 8/2002 | Ishiyama |
| 2002/0134966 | A1* | 9/2002 | Tahara ................ C09K 19/14 252/299.61 |
| 2004/0252076 | A1* | 12/2004 | Kodama ............. G09G 3/3208 345/3.1 |
| 2004/0257328 | A1 | 12/2004 | Lim |
| 2005/0078073 | A1 | 4/2005 | Mikami et al. |
| 2006/0106966 | A1* | 5/2006 | Joos ..................... G06F 13/385 710/305 |
| 2007/0146556 | A1 | 6/2007 | Fujimori |
| 2012/0139967 | A1* | 6/2012 | Miyasaka .............. G09G 3/344 345/690 |
| 2012/0154416 | A1 | 6/2012 | Nakanishi et al. |
| 2014/0267316 | A1* | 9/2014 | Connell ................... G06T 1/20 345/503 |
| 2015/0077447 | A1* | 3/2015 | Zhang ................ H01L 27/3213 345/694 |
| 2015/0228048 | A1 | 8/2015 | Heo et al. |
| 2016/0063664 | A1 | 3/2016 | Mizuno |

FOREIGN PATENT DOCUMENTS

| | | |
|---|---|---|
| JP | 2002323881 A | 11/2002 |
| JP | 2007121368 A | 5/2007 |
| JP | 2007163725 A | 6/2007 |
| JP | 2010164781 A | 7/2010 |
| JP | 5730002 B2 | 6/2015 |
| JP | 2016053621 A | 4/2016 |
| KR | 20050000012 A | 1/2005 |
| KR | 20130100498 A | 9/2013 |
| KR | 20150093548 A | 8/2015 |
| WO | 2012043825 A1 | 4/2012 |

OTHER PUBLICATIONS

Written Opinion dated Dec. 20, 2016 issued in International Application No. PCT/JP2016/077609.
Korean Office Action dated May 22, 2019 (and English translation thereof) issued in Korean Application No. 10-2018-7016592.
Korean Office Action dated Nov. 26, 2019 (and English translation thereof) issued in counterpart Korean Application No. 10-2018-7016592.
Chinese Office Action (and English language translation thereof) dated Apr. 22, 2020 issued in Chinese Application No. 201680072910.8.
Chinese Office Action (and English language translation thereof) dated Nov. 20, 2020 issued in Chinese Application No. 201680072910.8.

* cited by examiner

FIG. 2
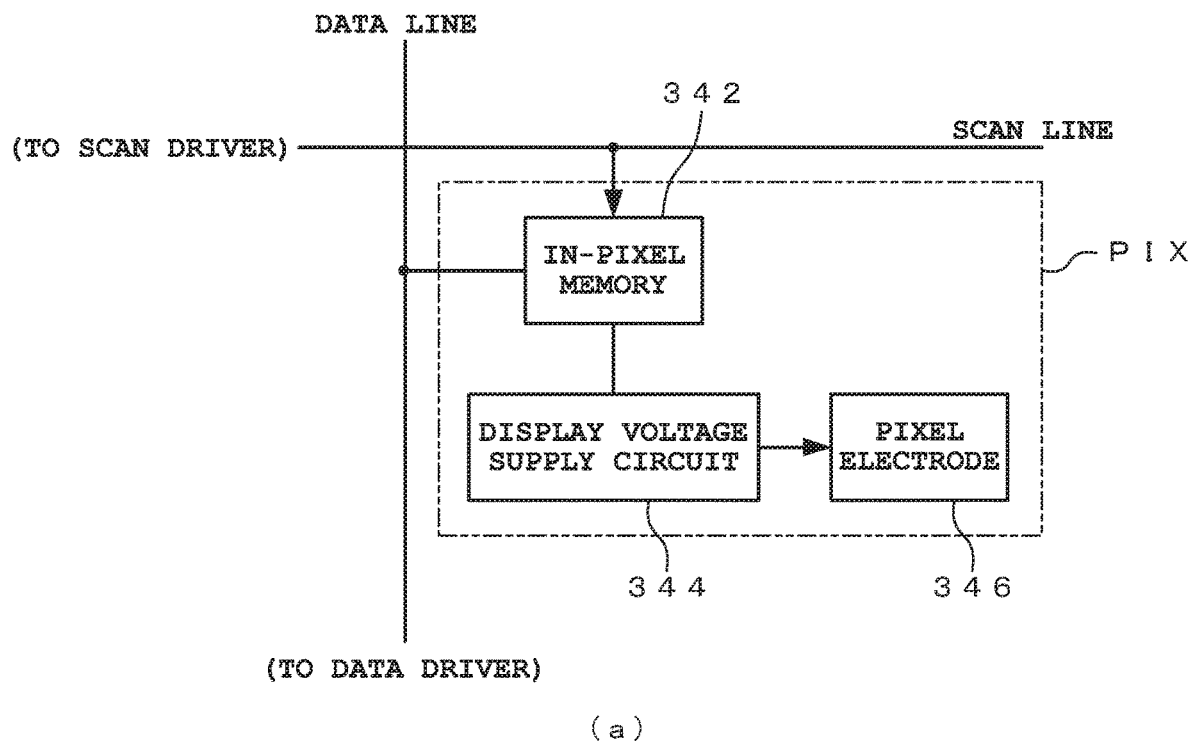
(a)
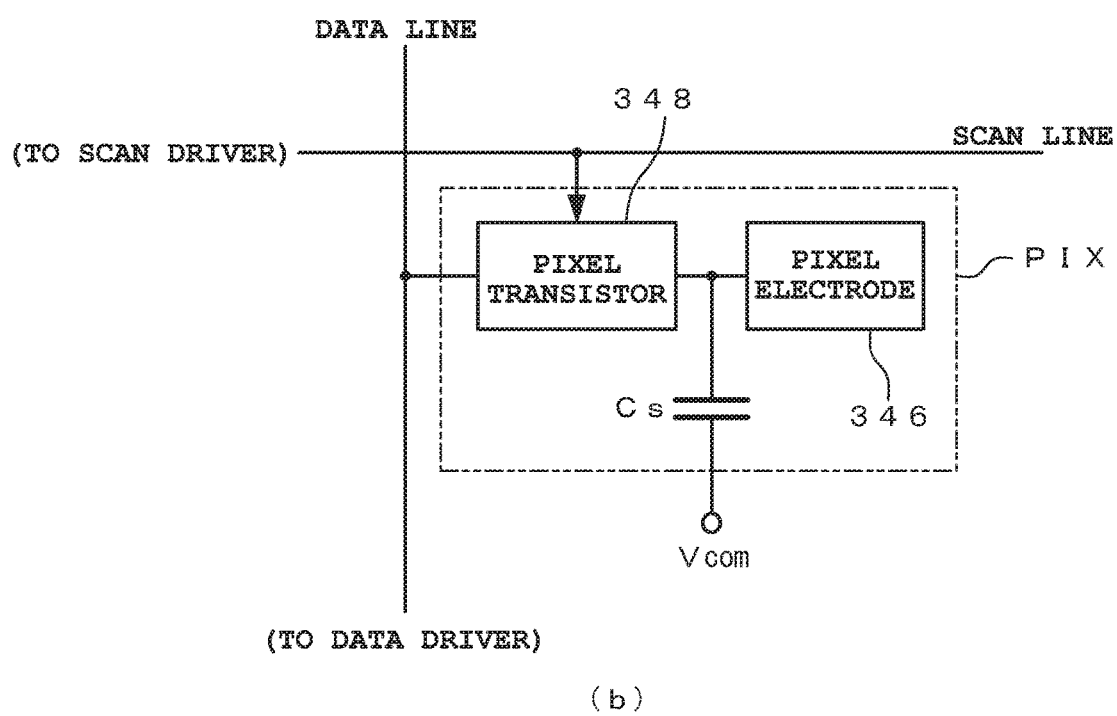
(b)

FIG. 12
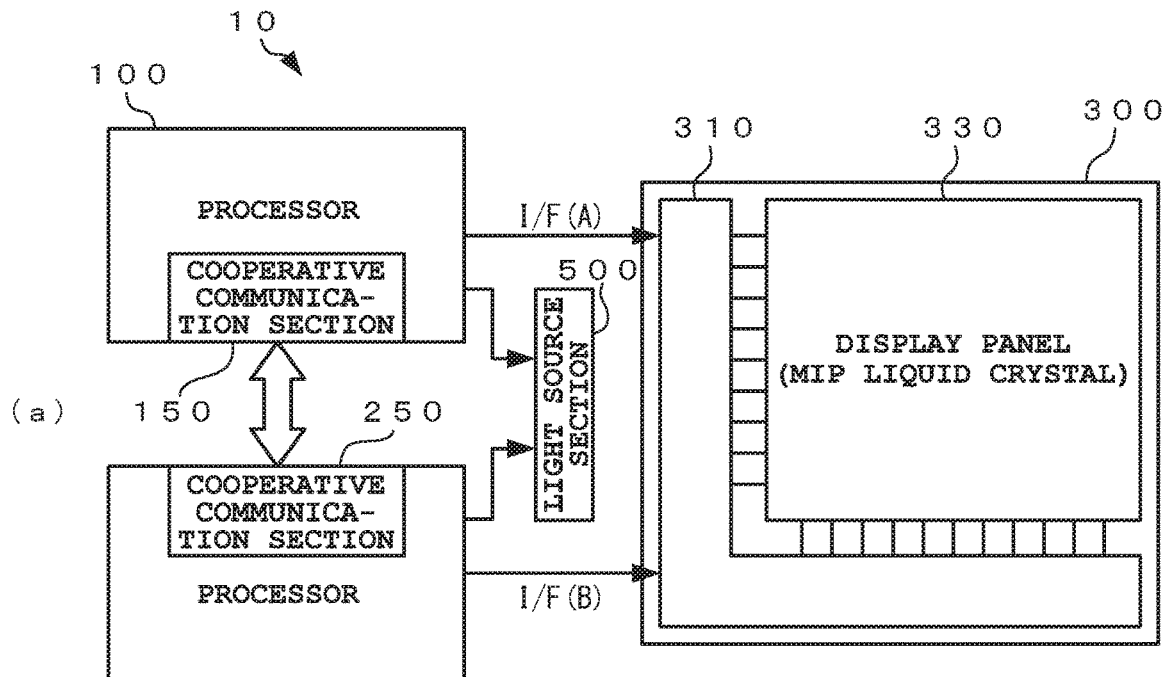
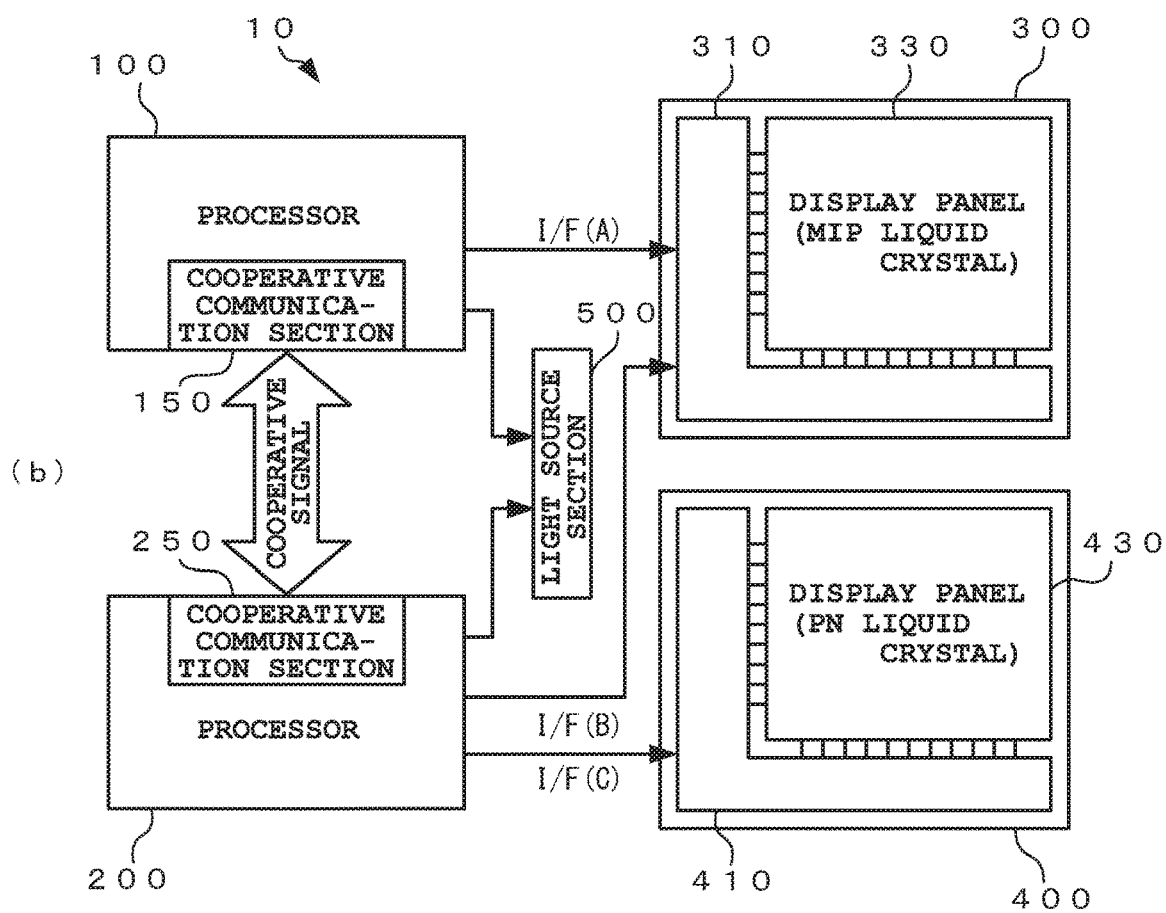

DISPLAY MODULE, DISPLAY DEVICE, AND METHOD FOR CONTROLLING SAME

CROSS-REFERENCE TO RELATED APPLICATIONS

The present application is U.S. National Phase application of International Application No. PCT/JP2016/077609, filed Sep. 13, 2016, claiming priority of and based on Japanese Patent Application No. 2015-250175, filed Dec. 22, 2015, the entire contents of both of which are incorporated herein by reference.

TECHNICAL FIELD

The present invention relates to display technology applied to an electronic device with a function of displaying various types of information.

BACKGROUND ART

In recent years, portable-type information communication devices such as so-called smart devices, smartphone (high-functionality-type portable telephone), and tablet terminals as being attached to the human body to collect various data at the time of exercise or in daily life have been significantly widespread. Including these devices, various electronic devices generally widespread have mounted thereon a display device for providing various information to users.

Here, to address desires for improvement of viewability by users, high-functionality display, and so forth, information to be displayed by the display device is desired to be on high-definition and high-speed (smooth) color display. In this color display, consumed power generally increases, and thus the drive time may be shortened in mount-type or portable-type electronic devices as described above and power-saving performance may decrease in stationary-type electronic devices. Moreover, in these electronic devices supporting color display, when mono-color display or monochrome display are performed even for simple information with a relatively small amount of information such as time display or incoming-call display, consumed power may become relatively increase.

Thus various schemes have been devised which can reduce consumed power while achieving various display functions such as high-definition and high-speed color display and simple information display.

For example, Patent Document 1 describes a configuration in an image forming devices such as a multifunction machine including a small-sized first display panel with low consumed power and a large-sized second display panel with high consumed power. In this configuration, in normal operation mode, the second display panel is turned. OFF and only the first display panel is turned ON to allow display. In detail display mode the first display panel is turned OFF and only the second display panel is turned ON to shift into a state in which setting details can be confirmed and a change operation can be performed. This achieves power saving without decreasing an information display function and operability of an operation panel section.

Also, Patent Document 2 describes a configuration in a liquid crystal display device in which a transmissive display area and a reflective display area are disposed with each of the pixels arranged in matrix form and individual sub-pixels are provided to each display area. In this configuration, a by selecting a display mode in accordance with a status of external light, transmissive display is performed by the sub-pixel in the transmissive display area of each pixel in transmissive mode to achieve vivid color display, and reflective display is performed by the sub-pixel in the reflective display area of each pixel to reduce consumed power while performing bright mono-color display or monochrome display.

PRIOR ART DOCUMENTS

Patent Documents

Patent Document 1: JP 2010-164781
Patent Document 2: JP 2007-121368

SUMMARY OF INVENTION

Problem to be Solved by the Invention

However, in the configuration described in the above-described Patent Document 1, it is required to judge switching by always monitoring the display mode in the operation panel section by one CPU, posing a problem in which the processing load in the CPU may increase to make consumed power impossible to be sufficiently reduced.

Also, in the configuration described in the above-described Patent Document 2, it is required to form a sub-pixel for transmissive display and a sub-pixel for reflective display for each pixel and individually control these in accordance with the display mode, by posing a problem in which display control becomes complex and the processing load in the CPU increases.

Thus, in view of the above-described problems, an object of the present invention is to provide a display module, display device, and method for controlling same which are capable of suppressing power consumption of an electronic device while providing a user with several types of information by various display methods.

Means for Solving the Problem

In accordance with one aspect of the present invention related to the first embodiment, there is provided a display module characterized by a display panel formed of a plurality of pixels having memory characteristics, the display panel having a predetermined image to be displayed based on pixel data retained in each of the plurality of pixels; and a driver circuit including a first reception port which receives first image data with a first transfer rate and a second reception port which receives second image data with a second transfer rate slower than the first transfer rate, the driver circuit writing the pixel data based on the first image data and the second image data in each of the plurality of pixels of the display panel, the driver circuit, in a first display mode, writing the pixel data based on the first image data received via the first reception port in each of the plurality of pixels and causing a first image based on the first image data to be displayed on the display panel, and in a second display mode, stopping reception from the first reception port, writing the pixel data based on the second image data received via the second reception port in each of the plurality of pixels and causing a second image based on the second image data to be displayed on the display panel.

Effect of the Invention

According to the present invention, power consumption of an electronic device can be suppressed while supplying a user with several types of information by various display methods.

BRIEF DESCRIPTION OF DRAWINGS

FIG. 2 is a detailed diagram depicting one example of a display panel to which the display device according to the first embodiment is applied.

FIG. 12 is a schematic block diagram depicting a modification example in each embodiment

DESCRIPTION OF EMBODIMENTS

In the following, the present invention is described in detail by presenting embodiments.

First Embodiment

Display Module, Display Device

Figure 1:
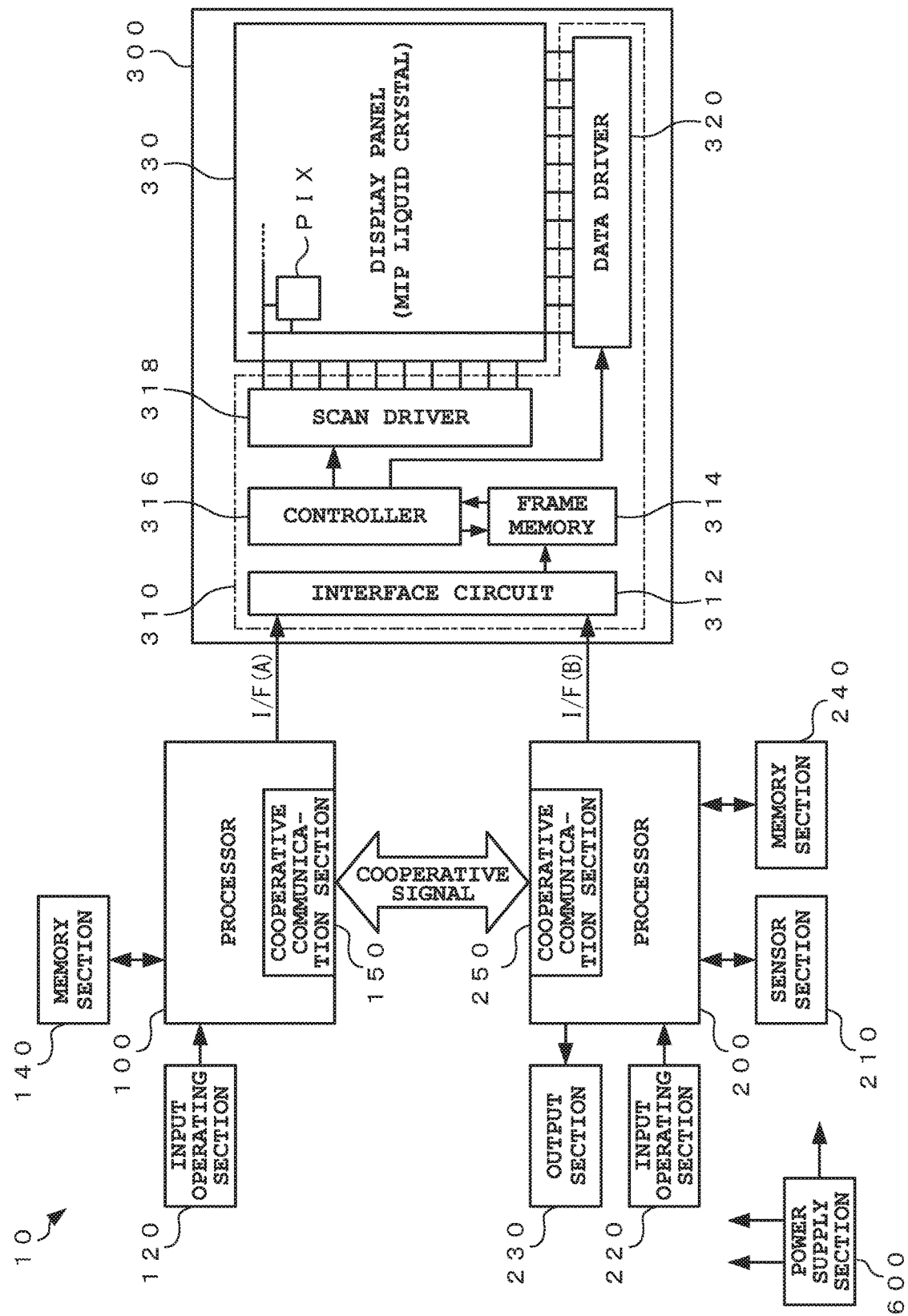
FIG. 1 is a schematic block diagram depicting a first embodiment of a display device according to the present invention.

FIG. 1 is a schematic block diagram depicting a first embodiment of a display device according to the present invention. Here, an example of structure when the display device according to the present embodiment is applied to a mount-type or portable-type electronic device is described. Here, the display device according to the present embodiment can be applied to various electronic devices with a display panel including, for example, a wrist-watch-type or wristband-type smart watch, a smartphone, a portable telephone, an outdoor-purpose portable device (for example, GPS logger) a vehicle-mounted device (for example, navigation system). Also, FIG. 2 is a detailed diagram depicting one example of a display panel to which the display device according to the present embodiment is applied.

A display device 10 according to the present embodiment specifically has, for example, as depicted in FIG. 1, a processor (first processor) 100, a processor (second processor) 200, and a display section (display module) 300. To the processor 100, at least an input operating section 120, a memory section 140, and a display section 300 are connected. Also, to the processor 200, at least a sensor section 210, an input operating section 220, an output section 230, a memory section 240, and a display section 300 are connected.

The processor 100 is an arithmetic operation circuit such as a CPU (Central Processing Unit) or MPU (Micro Processor), executing a predetermined control program or algorithm program to control, for example, processing operation in accordance with an operation signal in the input operating section 120 and display of various information in the display section 300, which will be described further below. Also, the processor 100 is connected via an interface (in the drawing, represented as "I/F (A)") having communication standards with a relatively rapid data transfer rate such as, for example, a serial interface such as MIPI (Mobile Industry Processor Interface) or any of various parallel interfaces, to an interface circuit 312 of the display section 300. And, the processor 100 transmits and receives a predetermined signal including generated image data (first image data) to and from the display section 300, thereby causing a predetermined image to be displayed on the display section 300. Also, the processor 100 includes a cooperative communication section 150, and transmits and receives a predetermined cooperative signal to and from the processor 200, which will be described further below, thereby controlling at least a display status of the display section 300 in cooperation and synchronization with the processor 200. The cooperative communication section 150 has a connection port of serial communication standards such as, for example, UART (Universal Asynchronous Receiver Transmitter) or I²C (Inter-integrated Circuit), and is connected to a cooperation communication section 250 provided to the processor 200, thereby transmitting and receiving at least a predetermined cooperative signal or interrupt signal for controlling the display status in the display section 300.

Here, applied as the processor 100 applied to the present embodiment is an arithmetic operation circuit with relatively high processing capacity to the extent that at least high-functionality display in the display section 300 (an entire display area) can be controlled. In the present embodiment, high-functionality display refers to display of images with a large number of levels of gray scale and high expressive power (that is, images with a large data capacity) and images with a high update frequency and many variations (motions) (hereinafter collectively referred to as "high-functionality images" for convenience), such as, for example, high-definition color images and color graphics, smooth moving images and animation display, and visual effects such as transition effects. This arithmetic operation circuit applied to the processor 100 performs various processing operations generally with a high operation frequency (first operation frequency), and therefore has large consumed power. In other words, this means that it is required to apply the arithmetic operation circuit with relatively high processing capacity (high performance) and high consumed power (high power) as the processor 100. In the present embodiment, to a display panel 330 of the display section 300, which will be described further below, for example, one with a relatively high operation frequency on the order of, for example, several hundreds of MHz to 1 GHz, is applied as the processor 100 in order to achieve image writing at a relatively high frame rate of for example, 30 fps or 60 fps. Here, the control program and the algorithm program to be executed in the processor 100 may be stored in the memory section 140 or may be incorporated in advance inside the processor 100.

The input operating section 120 is input means such as a touch panel arranged on a visual field side of the display panel 330 provided to the display section 300, which will be described further below, and outputs various operation signals due to user input operation to the processor 100. Accordingly, in the processor 100, selection, setting, and so forth of an item and information to be displayed on the display panel 330 are performed.

The memory section 140 stores data to be used or data to be generated when the predetermined control program or algorithm program is executed in the processor 100, data to be displayed on the display section 300, and so forth. Also, in the memory section 140, a control program or algorithm program to be executed in the processor 100 may be stored. Note that a part or entirety of the memory section 140 may have a form as a removable storage medium such as, for example, a memory card, and may be configured so as to be attachable to and detachable from the display device 10.

As with the above-described processor 100, the processor 200 is an arithmetic operation circuit such as a CPU or MPU, executing a predetermined control program or algorithm program to control, for example, sensing operation in the sensor section 210, processing operation in accordance with input operation in the input operating section 220, provision of various information in the output section 230, and a display status of various information in the display section 300, which will be described further below. Also, the processor 200 is connected via an interface (in the drawing, represented as "I/F(B)") having communication standards with a relatively slow data transfer rate such as, for example, a serial interface such as SPI (Serial Peripheral Interface), to the interface circuit 312 of the display section 300. And, the processor 200 transmits and receives a predetermined signal including generated image data (second image data) to and from the display section 300, thereby causing a predetermined image to be displayed on the display section 300. Also the processor 200 includes a cooperative communication section 250 having a structure equivalent to that of the cooperative communication section 150 provided to the above-described processor 100, and transmits and receives a predetermined cooperative signal to and from the processor 100 described above, thereby controlling at least a display status of the display section 300 in cooperation and synchronization with the processor 100.

Here, applied as the processor 200 applied to the present embodiment is an arithmetic operation circuit with relatively low processing capacity to the extent that, for example, the sensor section 210 cyclically performing sensing operation and so forth can be controlled and a simple image can be displayed on the display section 300. In the present embodiment, the simple image (second image) refers to images with a small number of levels of gray scale and low expressive power (that is, images with a small data capacity) and images to which the updating area of the screen display is limited, such as, for example, mono-color and monochrome images of a time, icon, and so forth, and segment images. This arithmetic operation circuit applied to the processor 200 is only required to perform processing operation generally with a low operation frequency (second operation frequency), and therefore consumed power can be reduced. In other words, this means that an arithmetic operation circuit which operates with a lower operation frequency compared with the above-described processor 100 and with relatively low processing capacity (low performance) and low consumed power (low power) can be applied as the processor 200. In the present embodiment, as the processor 200, one with a relatively low operation frequency on the order of, for example, several MHz to several tens of MHz, is applied as the processor 200 in order to achieve favorable sensing operation in the sensor section 210. Here, the control program and the algorithm program to be executed in the processor 200 may be stored in the memory section 240 or may be incorporated in advance inside the processor 200.

The sensor section 210 is, for example, sensor means such as an acceleration sensor, gyro sensor, geomagnetic sensor, barometric sensors, temperature-humidity sensor, pulse sensor, or heart rate sensor, or positioning means including a GPS receiving section, and acquires physical data, biological data, geographic data, and so forth during exercise or in daily life of the user (hereinafter collectively referred to as "sensor data") for output to the processor 200.

The input operating section 220 is input means such as, for example, a button switch, slide switch, microphone, and so forth provided to a housing of the electronic device, outputting various operation signals due to user input operation to the processor 200. This causes, in the processor 200, setting and control of operation in the sensor section 210 and the output section 230 and selection, setting, and so forth an item and information to be displayed on the display section 300, which will be described further below.

The output section 230 is acoustic means such as buzzer or loudspeaker and/or vibration means such as a vibration motor or vibrator, generating a predetermined sound tone and/or sound pattern, sound information such as a voice message, or vibration information such as a predetermined vibration pattern and/or its intensity, thereby providing or notifying the user with or of various information through the sense of hearing and/or the sense of touch. Here, the output section 230 may generate predetermined sound information and/or vibration information in conjunction with, for example, various information displayed on the display section 300, which will be described further below.

The memory section 240 stores, for example, the sensor data acquired by the sensor section 210, in a predetermined storage area. Also, the memory section 240 stores, for example, data to be used and data to be generated when the predetermined control program or algorithm program is executed in the processor 200. Also, in the memory section 240, a control program or algorithm program to be executed in the processor 200 may be stored. Note that the memory section 240 may be integrally configured with the memory section 140 connected to the above-described processor 100.

The display section 300 includes a driver circuit (or driver IC; driver circuit) 310 and the display panel 330 with a reflective type panel structure, as depicted in FIG. 1. The driver circuit 310 includes an interface circuit 312, a frame memory 314, an LCD controller (in the drawing, abbreviated as "CONTROLLER") 316, a scan driver 318, and a data driver 320.

The interface circuit 312 has a plurality of reception ports of different standards to receive a predetermined signal including image data via a separate signal line from each of the processor 100 and the processor 200. Specifically, the interface circuit 312 is connected to the processor 100 at least at a first reception port via the interface I/F(A) with a relatively rapid data transfer rate such as, for example, MIPI, and is connected to the processor 200 at a second reception port via the interface I/F(B) with a relatively slow data transfer rate such as, for example, SPI.

The frame memory 314 sequentially overwrites with image data generated by the processor 100 and the processor 200 and individually transmitted via the above interface circuit 312 to store image data for one screen of the display panel 330. Specifically, in a state in which image data from either one of the processor 100 and the processor 200 is written in the frame memory 314, when image data is written from the other processor, the latter image data is written over and stored so as to be effective. Here, by specifying an address at the time of writing the image data, only image data at the corresponding address among image data already written in the frame memory 314 is overwritten. Note that the timing when image data is transmitted from each of the processor 100 and the processor 200 to the driver circuit 310 is controlled by transmitting and receiving a cooperative signal between the processor 100 and the processor 200 in mutual cooperation and synchronization with each other.

The LCD controller 316 reads image data stored in the frame memory 314 for each address, controls the scan driver 318 and the data driver 320, and sequentially write the image data at a predetermined frame rate in each pixel PIX of the display panel 330, thereby causing an image based on the image data to be displayed for each screen of the display panel 330 or in a specific area of the display panel 330.

The display panel 330 is a reflective type color liquid crystal panel (hereinafter abbreviated as "memory characteristic liquid crystal panel"; in the drawing, represented as "MIP LIQUID CRYSTAL") with a plurality of pixels PIX having memory characteristics arrayed in matrix form, and has various information to be displayed by the above-described driver circuit 310 based on the image data generated in the processor 100 and the processor 200 in a predetermined display format (a high-functionality image, simple image, or the like).

In detail, the memory-characteristic liquid crystal panel applied to the display panel 330 has, for each pixel PIX arranged at a point of intersection of each scan line connected to the scan driver and each data line connected to the data driver, an in-pixel memory 342, a display voltage supply circuit 344, and a pixel electrode 346, as depicted in FIG. 1 and FIG. 2(*a*). As the in-pixel memory 342, for example, a SRAM (Static Random Access Memory) can be applied. Note that when the memory characteristic liquid crystal panel has a reflective type panel structure, for example, as a counter electrode (omitted in the drawing) opposed to the pixel electrode 346, a thin-film material element with high reflectivity is used, thereby allowing the counter electrode to function as a reflector which reflects external light And, the present embodiment has a feature in which, as a display control method in this memory-characteristic liquid crystal panel, two schemes as described below can be performed as being switched in accordance with the frequency of updating a display mode or image, the area to be rewritten, and so forth. Note that the display mode will be described in detail in a display device control method, which will be described further below.

In a first display control method for the memory-characteristic liquid crystal panel, as depicted in FIG. 2(*a*), first, in a state in which the pixel PIX is selected by the scan line, pixel data based on the image data is supplied to the data line, and thus the pixel data is stored (retained) in the in-pixel memory 342 of each pixel PIX. Then, by the display voltage supply circuit 344, a voltage in accordance with the pixel data stored in the in-pixel memory 342 is applied to the pixel electrode 346, thereby causing the liquid crystal to be oriented based on voltage between the pixel electrode 346 and the counter electrode (pixel voltage) to control the display status in each pixel PIX.

In the memory characteristic liquid crystal panel to which this first display control method is applied, the memory characteristic liquid crystal panel has a characteristic in which a state in which a predetermined voltage in accordance with the pixel data stored in the in-pixel memory 342 of each pixel PIX is applied from the display voltage supply circuit 344 to the pixel electrode 346 is retained and potential fluctuations do not occur in the pixel electrode 346 and thus the screen display is retained. Thus, the memory characteristic liquid crystal panel in this case is suitable for, for example, still images not required to be rewritten images with a low frequency of rewrite (update frequency), and a case in which an image for which image rewrite is required only in a specific display area. That is, unlike a general active matrix type liquid crystal panel, it is not required to repeatedly write pixel data in the pixel electrode of each pixel with a predetermined cycle (for example, a frequency of 60 Hz) to keep the display status in the display panel 330. Also, in a period or area requiring image rewrite, the pixel data can be written by specifying an address to the pixel PIX where an image change occurs, and thus the processing load on the processor which generates image data defining the pixel data can be reduced.

Also in the memory characteristic liquid crystal panel in this case, the inverted frequency of the counter electrode can be set low (for example, 1 Hz), and the voltage to be applied to the pixel electrode 346 can be set low (for example, 5V). Furthermore, in the memory characteristic liquid crystal panel with a reflective type panel structure, a clear image with high viewability can be displayed even bright outdoors or the like, and thus a light source such as a backlight is not required to be provided. Therefore, according to the memory characteristic liquid crystal panel to which the first display control method is applied, compared with the active matrix type liquid crystal panel, the frequency of the pixel-data rewrite operation can be lowered, the write voltage can be lowered, and consumed power of the display device 10 can be significantly reduced while the processing load of the driver circuit 310 is reduced.

Also in the memory characteristic liquid crystal panel applied to the present embodiment, as a second display control method, the display status in each pixel PIX can be controlled by a display control method equivalent to that of a general active matrix type liquid crystal panel without using the in-pixel memory 342 and the display voltage supply circuit 344 depicted in FIG. 2(*a*) (that is without storing the pixel data in the in-pixel memory 342 or irrespectively of the image data retained in the in-pixel memory 342). That is, as depicted in FIG. 2(*b*), with the pixel PIX selected by the scan line, a voltage in accordance with the pixel data supplied to the data line via a pixel transistor TFT 348 is applied to the pixel electrode 346 of each pixel PIX, and the display status (orientation status of the liquid crystal) in each pixel PIX is controlled. Here, the image data for use in writing to each pixel PIX is image data received via each reception port of the interface circuit 312 and stored in the frame memory 314.

In this manner, when the memory characteristic liquid crystal panel is driven by applying the second display control method, as with the general active matrix type liquid crystal panel, consumed power of the display device 10 is increased, but this method is suitable when images with a large number of levels of gray scale and high expressive power and images with a high update frequency and many variations (motions), such as high-definition color images and color graphics, smooth moving images, and animation images.

In this manner, the display panel 330 applied to the present embodiment has, in addition to a display function unique to the memory characteristic liquid crystal panel (screen display by the first display control method), a display function equivalent to that of the general active matrix type liquid crystal panel (screen display by the second display control method). In the memory characteristic liquid crystal panel in which these two display control methods can be selectively performed, each pixel PIX includes at least both of the circuit structure depicted in FIG. 2(a) and the circuit structure depicted in FIG. 2(b), selection means is provided which performs control of selecting either one in accordance with the display mode and separating (disabling) the other.

Note that in FIG. 2(a) and FIG. 2 (b), although depiction is simplified, the display panel 330 supports color display, each pixel PIX of the memory characteristic liquid crystal panel is configured of three-color sub-pixels of R (red), G (green), and B (blue), and each of the sub-pixels of RCB is driven and controlled in, for example, eight-bit gray scale. In this case, the image data of each pixel PIX stored in the frame memory 314 of the driver circuit 310 is configured of 24 bits (R: eight bits, G: eight bits, B: eight bits)

Thus, in the present embodiment, the image based on the image data generated by the processor 100 is displayed on the display panel 330, thereby causing a high-functionality image such as a color image with a relatively high reflectivity and excellent outdoor viewability to be visually viewed by the user. Also, when the data capacity of the image displayed on the display panel 330 is small or in a state in which the frequency of updates and changes (motions) of screen display are few, the processor 100 and the processor 200 cooperate mutually in accordance with the display status, and the image based on the image data generated by the processor 200 is displayed in a predetermined area of the display section 300, thereby causing a simple image such as a mono-color image or segment image with a relatively high reflectivity and excellent outdoor viewability to be visually viewed by the user. Note that the image display method in the display section 300 is described in detail further below.

And, each of the above-described structures achieve respective functions by drive power supplied from a power supply section 600, as depicted in FIG. 1. Here, in the mount-type or portable-type electronic device, as the power supply section 600, it is possible to use, singly or in combination, a primary battery such as a commercially-available button-shaped battery, a secondary battery such as a lithium-ion battery, a power supply by energy harvest technology for generating electricity by energy such as vibrations, light, heat, or electro-magnetic waves, or the like.

Note that although the processor 100 and the processor 200 are depicted as separate structures in the present embodiment as depicted in FIG. 1, the present invention is not limited to this configuration. For example, the processor 100 and the processor 200 may be mounted and integrated on a single semiconductor substrate in a form of System-on-a-Chip (SOC). Also in this case, the interfaces I/F(A) and I/F(B) to connect each of the processors 100 and 200 and the display section 300 and transmit and receive a predetermined signal are individually provided.

Also, although depiction is omitted in the present embodiment, the processor 100 and the processor 200 may include a communication interface section (hereinafter abbreviated as "communication I/F section") which transmits and receives various data and signals by a predetermined communication scheme using a wire or wirelessly between the electronic device where the display device 10 is mounted and a device provided outside (hereinafter referred to as an "external device"). Here, when the (high-power, high-performance) processor 100 is provided with the communication I/F section to transmit and receive data and so forth via wireless communication to and from an external device (for example, a high-functionality information processing device such as a smartphone or personal computer), a wireless communication scheme capable of transmitting and receiving data with a relatively large capacity at high speeds is applied, such as Bluetooth (registered trademark) communication or Wi-Fi (wireless fidelity (registered trademark)) communication. On the other hand, when the (low-power, low-performance) processor 200 is provided with the communication I/F section to transmit and receive data and so forth via wireless communication to and from an external device (for example, a sensor device attached to another part of the body), a wireless communication scheme with low consumed power is applied, such as for example, Bluetooth (registered trademark) Low Energy (BLE) communication.

Display Device Control Method

Next, the display device control method according to the present embodiment is described. Here, a control method is described when the user performs exercise such as running or walking or lives daily life in a state in which the electronic device to which the above-described display device 10 is applied is attached to the body or carried. Here, a series of processing operations described below are achieved by the processor 100 and the processor 200 executing a predetermined algorithm program in mutual cooperation. Also in the specification, in the display device control method described below, various operation status of the display device including each display mode for causing an image to be displayed by using the display panel 330 and a display halt mode for disabling an image to be displayed on the display panel 330 are referred to as "operation mode". That is, each display mode described below is one form of the operation mode in the present embodiment.

Figure 3:
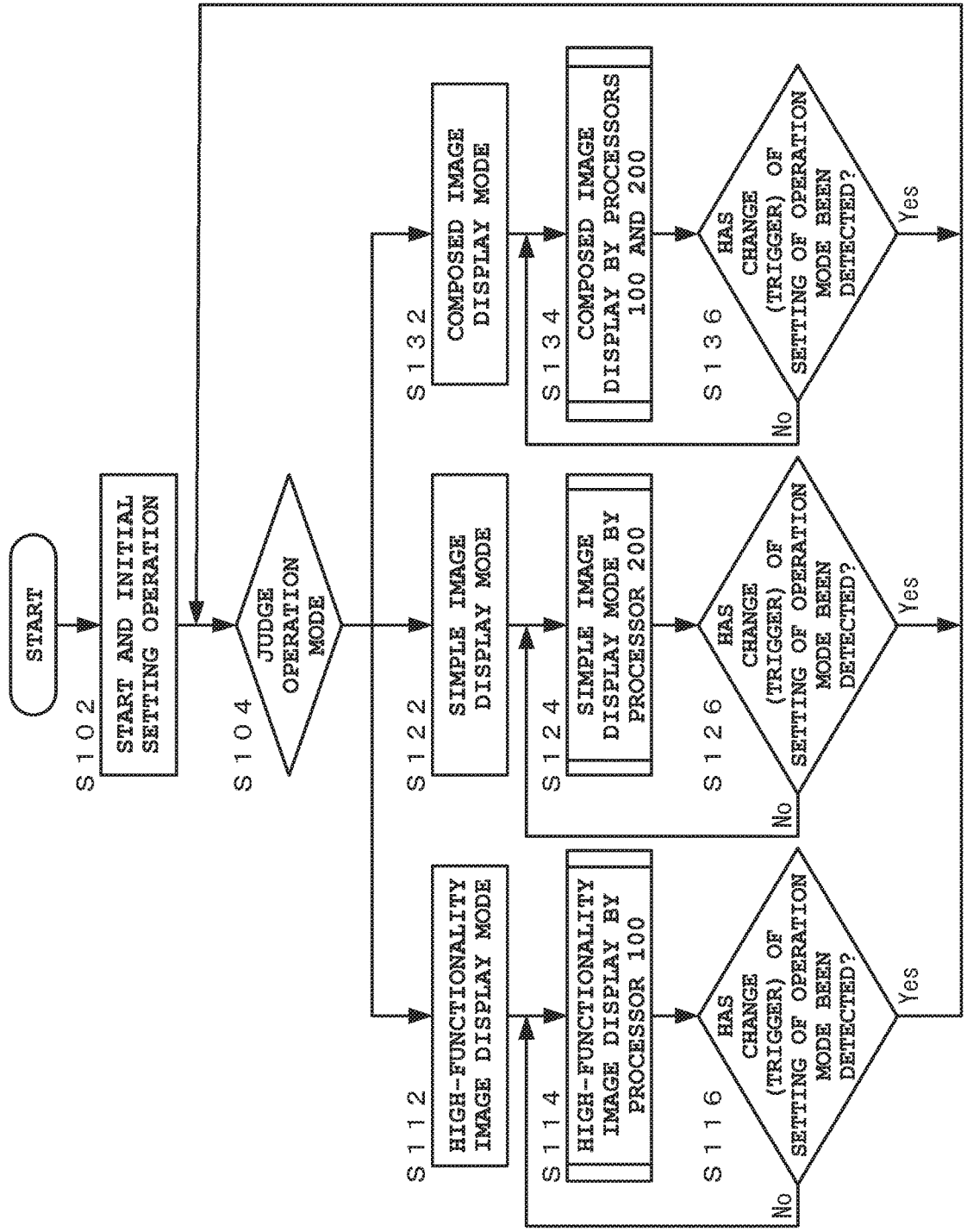
FIG. 3 is a flowchart depicting one example of a display device control method according to the first embodiment.
Figure 4:
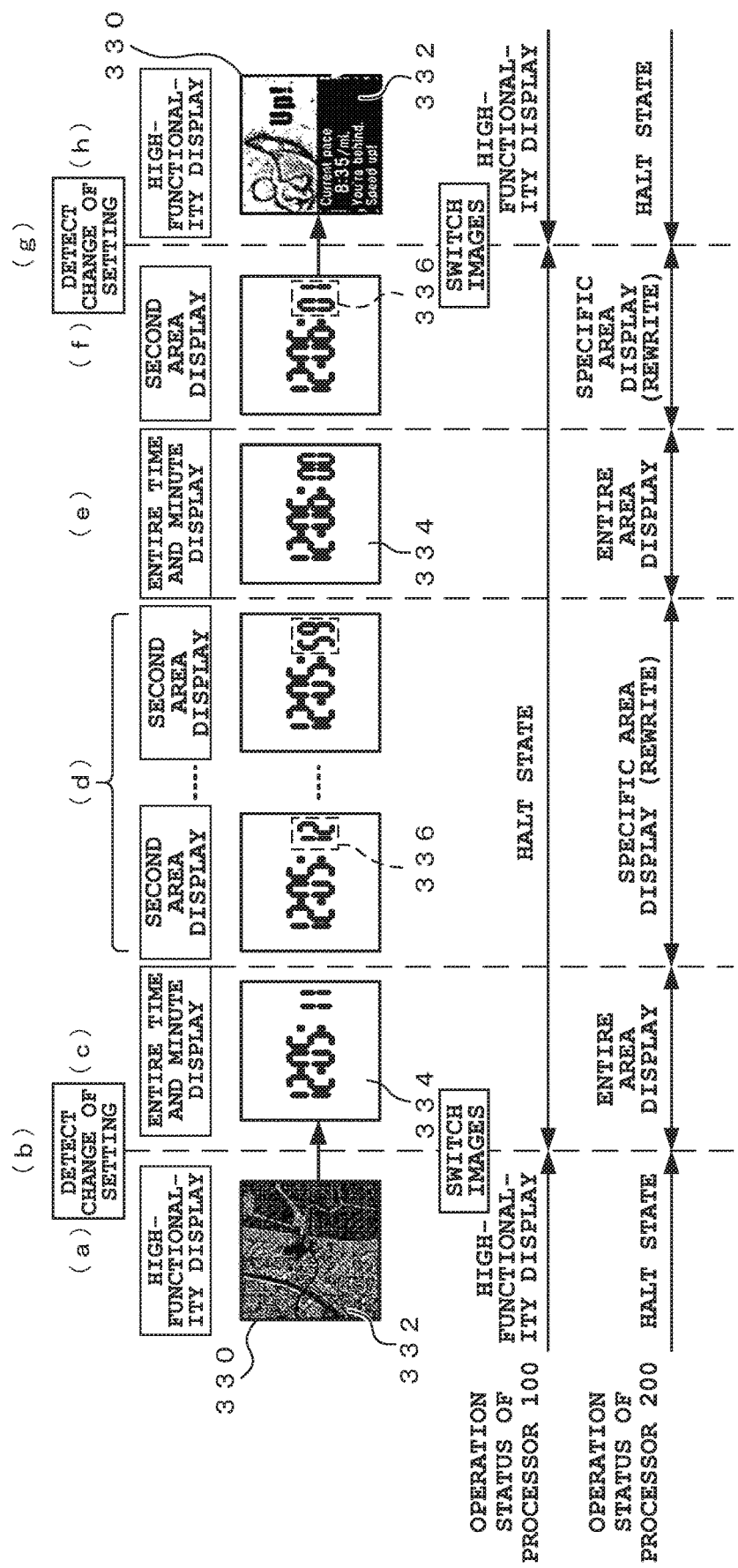
FIG. 4 is a diagram depicting a (first) display form in the display device according to the first embodiment.
Figure 5:
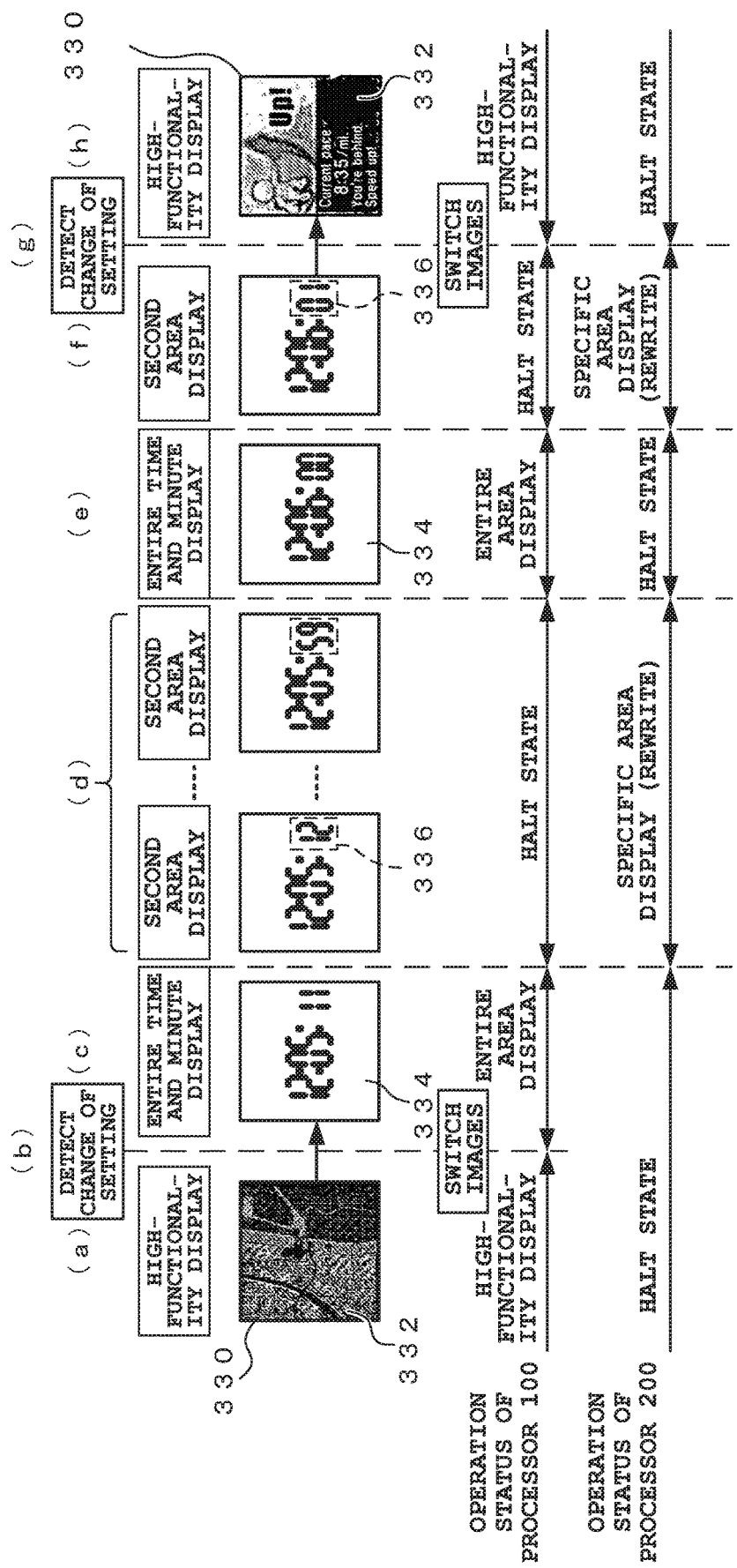
FIG. 5 is a diagram depicting a (second) display form the display device according to the first embodiment.
Figure 6:
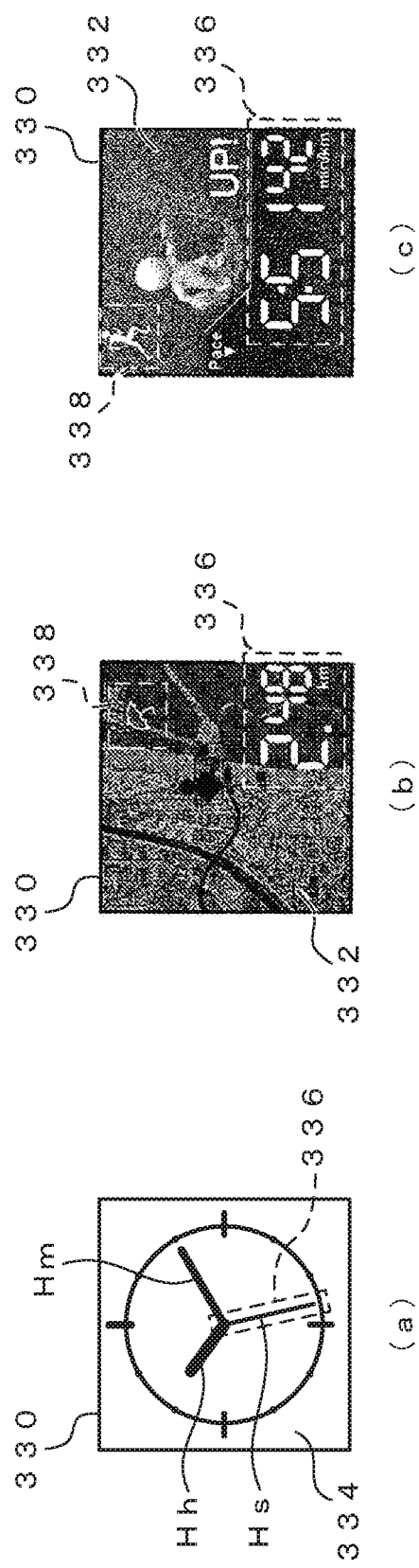
FIG. 6 is a diagram depicting a (third) display form in the display device according to the first embodiment.

FIG. 3 is a flowchart depicting one example of a display device control method according to the present embodiment, and FIG. 4 to FIG. 6 are diagrams depicting display forms in the display device according to the present embodiment. Here, description is made with reference to the above-described configuration of the display device as appropriate.

In the display device control method according to the present embodiment, first, when the user operates the above-described input operating section 220 to cause drive power to be supplied from the power supply section 600 to start the display device 10, in the processors 100 and 200, a function and application (software) to be executed in an initial state are set, for example, as depicted in the flowchart of FIG. 3.

Also simultaneously, an operation mode regarding display status and consumed power in the display device 10 is initially set (Step S102). Here, the operation mode initially set at Step S102 may be set (defined) in advance in a program to be executed in the processors 100 and 200 or may be set by the user at will.

In the present embodiment, as operation modes of the display device 10, a "high-functionality image display mode" (first display mode) for displaying a high-functionality image such as a color image, a "simple image display mode" (second display mode) for displaying a simple image such as a mono-color or segment image, and a "composed image display mode" (third display mode) are prepared in advance, and any of the operation modes selectively set. Note that other than these respective display modes, as an operation mode of the display device 10, a "display halt mode" may be provided, which is a non-display state in which an image is not displayed on the display panel 330.

Next, the processors 100 and 200 judges the operation mode initially set at Step S102 (Step S104) and, in accordance with the result controls the display mode of the image in the display section 300. In the following, the display form (an example of screen display on the display panel 330) and the processing operation in each operation mode are described.

(1) High-Functionality Image Display Mode

When the display device 10 is judged at Step S104 as being set in the high functionality image display mode (Step S112), image data for one screen of the display panel 330 generated by the processor 100 is transmitted via the interface I/F(A) to the first reception port of the interface circuit 312 of the driver circuit 310 and is sequentially stored in the frame memory 314.

Here, the display panel 330 has each pixel PIX configured of sub-pixels of three colors of RGB. Thus, in the high-functionality image display mode, the image data generated by the processor 100 and stored in the frame memory 314 has a data amount of 24 bits (=eight bits×three colors) per pixel PIX when each sub-pixel is driven and controlled in, for example, eight bit gray scale.

And, the image data stored in the frame memory 314 is read for each sub-pixel for the pixel PIX at the address specified by the LCD controller 316, and is sequentially written as pixel data in the sub-pixel of that pixel PIX of the display panel 330 at a predetermined frame rate. This causes a voltage in accordance with the pixel data to be applied to the pixel electrode 346 for each sub-pixel of each of the pixels PIX arranged on the display panel 330 and, for example, as depicted in an upper stage of FIG. 4 (a) and (b), a high-functionality image 332 with a large number of levels of gray scale and rich expressive power such as a color image or moving image is displayed on the entire display area.

In this high-functionality image display mode, as depicted in a lower stage of FIGS. 4 (a) and (b), the processor 100 controls high-functionality display of a color image or the like on the display panel 330, and a function regarding display of the display panel 330 in the processor 200 makes transition to a halt state (sleep state) or a state in which drive power from the power supply section 600 is interrupted (power supply OFF state). That is, in the high-functionality image display mode, operation of all functions of the processor 100 continues, and operation of functions regarding control of the sensor section 210, the input operating section 220, and the output section 230 other than the functions regarding display in the processor 200 continues without a halt. This operation in the display device 10 is performed by the processor 100 and the processor 200 transmitting and receiving a cooperative signal via the cooperative communication sections 150 and 250 in mutual cooperation.

Here, in the present embodiment, the halt state (sleep state) is a power saving state in which power is controlled so as to be supplied only to components required at minimum and, for example, a state called standby or sleep of S1 or S3 among the sleeping modes S0 to S5 defined in ACPI (Advanced Configuration and Power Interface), which is published unified standard regarding power source control and components. Note that the halt state may referred to as a standby mode, sleep mode, power saving state, or the like.

Thus, in the high-functionality image display mode, the color image or the like displayed on the display panel is visually recognized by the user, and consumption of power by the processor 200 is reduced. Here, since the display panel 330 has a panel structure with high reflectivity and high outdoor viewability, a color image, moving image, or the like with a large number of levels of gray scale and rich expressive power can be clearly displayed while consumed power in the display device 10 is reduced. Note that, in this high-functionality image display mode, when the high-functionality image 332 displayed on the display panel 330 is a still image or an image with a low update frequency of a screen display, the display panel 330 as a memory characteristic liquid crystal panel is driven by applying the above-described first display control method. On the other hand, when the high-functionality image 332 is an image with a high update frequency of a screen display or many variations (motions), the display panel 330 is driven by applying the above-described second display control method.

Next, in a state in which the display device 10 is set in the high-functionality image display mode, it is monitored always or at a predetermined timing by the processor 100 or the processor 200 whether an event (trigger) of changing the setting of the operation mode has been detected (Step S116). Here, the event of changing the setting of the operation mode of the display device 10 indicates a case, for example, the setting of the display status of each image by application, the operation of the input operating sections 120 and 220 by the user, detection of a specific physical, biological, or geographic status by the sensor section 210, a lapse of time (timeout) set in advance from a predetermined state (for example, an end of the input operation by the user), or a decrease of the remaining amount of a battery in the power supply section 600 has been detected.

At Step S116, if an event of changing the setting of the operation mode has not been detected, the processors 100 and 200 continue operation in the high-functionality image display mode. On the other hand, if that event has been detected (corresponding to (b) of FIG. 4), the processors 100 and 200 return to Step S104 to control the display form of the image in the display section 300 in accordance with the judgment result of a newly-set operation mode.

This high-functionality image display mode is applied when, for example, in an electronic device such as a smartwatch the user actively operates a touch panel of the smartwatch or the like. In this case, as described above, since the processor 100 with high processing capacity is used, the response speed, operability, and so forth of the display device 10 with respect to user input operation can be optimized to improve user's usability.

(2) Simple Image Display Mode

When the display device 10 is judged at the above Step S104 as being set in the simple image display mode (Step S122), image data for one screen of the display panel 330 generated by the processor 200 or image data in a specific area is transmitted via the interface I/F(B) to the second reception port of the interface circuit 312 of the driver circuit 310. With the image data received at the interface circuit 312, the frame memory 314 is sequentially overwritten for storage, and then the image data is read for each sub-pixel for the pixel PIX at the address specified by the LCD controller 316, and is sequentially written as pixel data in the sub-pixel of that pixel PIX of the display panel 330.

Alternatively, image data generated by the processor 200 and sequentially transmitted for each pixel PIX of the display panel 330 via the interface I/F(B) to the second reception port of the interface circuit 312 of the driver circuit 310 is directly written by the LCD controller 316 as pixel data by specifying an address of each pixel PIX Here, in the simple image display mode, when the sub-pixels of three colors of RGB of each pixel PIX are driven and controlled in, for example, one-bit gray scale, the image generated by the processor 200 has a data amount of three bits (=one bit×three colors) per pixel PIX. Note that the image data generated by the processor 200 is not limited to have the data amount when the sub-pixels are driven and controlled in one-bit gray scale, and is only required to have a data amount allowing the sub-pixel to be driven and controlled in gray scale of the number of bits smaller than the number of bits of the image data generated by the processor 100 (that is, a number of levels of gray scales smaller than that of the high-functionality image).

This causes a voltage in accordance with the pixel data to be applied to the pixel electrode 346 for each sub-pixel of each of the pixels PIX arranged on the display panel 330 and, for example, as depicted in an upper stage of (c) and (e) of FIG. 4, a simple image 334 with a small number of levels of gray scale and low expressive power indicating time or the like is displayed on the entire display area of the display panel 330. When this simple image 334 is a still image, an image with a low update frequency of a screen display, or an image for which image rewrite is required only in a specific display area, the display panel 330 as the memory characteristic liquid crystal panel is driven by applying the above-described first display control method and, based on the display characteristics of that display control method, that screen display is retained. Also, when an address of a specific area on the display panel 330 is specified by the LCD controller 316, for example, as depicted in an upper stage of (d) and (f) of FIG. 4, only a simple image 336 of the specific area with the address specified is rewritten in the simple image 334 displayed on the entire display area of the display panel 330.

Specifically, when the image displayed on the display panel 330 is an image indicating time as depicted in an upper stage of (c) to (f) of FIG. 4 and when the image in the entire display area of the display panel 330 is rewritten, image data for one screen of the display panel 330 including "hour, minute, second" is generated by the processor 200. Then, with this image data written by the driver circuit 310 in the display panel 330 at an image switching timing and, for example, with a cycle of one minute, as depicted in an upper stage of (c) and (e) of FIG. 4, the image 334 in the entire display area is switched to "12:05:11" and, subsequently, is sequentially rewritten as "12:06:00"→ . . . every minute when "time, minute" changes (in the drawing, refer to "ENTIRE AREA DISPLAY" in the processor 200).

Also, when the image of "second" in which display is changed every one second is rewritten in the image 334 of "hour, minute, second" displayed on the display panel 330, image data in the area indicating "second" is generated by the processor 200. Then, with this image data written by the driver circuit 310 in the display panel 330 with a cycle of one second by specifying an address, as depicted in an upper stage of (d) and (f) of FIG. 4, the image 336 of "second" is sequentially written as "12"→"13"→ . . . "59" every second (in the drawing, refer to "SPECIFIC AREA DISPLAY" in the processor 200). Here, in the image 334 of "hour, minute, second", as for the display area of "hour, minute" in which display is changed every minute, image data for one screen generated by the processor 200 is written and retained by the driver circuit 310 in the display panel 330 as a memory characteristic liquid crystal panel with a cycle of one minute, and thus the image of "hour, minute" does not change for fifty-nine seconds.

In this simple image display mode, as depicted in a lower stage of (c) to (f) of FIG. 4, in addition to control of the sensor section 210, the input operating section 220, and the output section 230, the processor 200 performs control of display of the simple images 334 and 336 on the display panel 330, and the entire processor 100 or the function regarding display of the display panel 330 in the processor 100 makes a transition to a halt state or a power supply OFF state. That is, in the simple image display mode, operation of all functions of the processor 200 continues. This operation of the display device 10 is performed by the processor 100 and the processor 200 cooperating mutually.

This causes the simple image displayed on the display panel 330 to be visually recognized by the user and reduces consumption of power by the processor 100 in the simple image display mode. Here, as described above, since the display panel 330 has a reflective type panel structure, a simple image with a small number of levels of gray scale and low expressive power such as time or icon can be vividly displayed while consumed power in the display device 10 is reduced.

Next, in a state in which the display device 10 is set in the simple image display mode, it is monitored by the processor 200 whether an event of changing the setting of the operation mode has been detected (Step S126), and if not detected, the processor 200 continues the operation in the simple image display mode. On the other hand, if that event has been detected, the processor 200 returns to Step S104 to control the display form of the image in the display section 300 in accordance with the judgment result of a newly-set operation mode. Here, while the processor 100 is set in a halt state in the simple image display mode, by halting only the function regarding display of the display panel 330, operation of the input operating section 120 such as a touch panel by the user can be included as an event of changing the setting of the operation mode of the display device 10.

This simple image display mode is applied to a case in which, for example, in a state in which the user does not operate the touch panel of a smartwatch or the like, the user glances screen display to check information such as time or a measurement value by a sensor. In this case, as described above, the processor 100 with high processing capacity is halted, and the processor 200 with low processing capacity is used. This can significantly reduce consumed power of the display device 10 to prolong the drive time of the electronic device.

(3) Composed Image Display Mode

When the display device 10 is judged at the above Step S104 as being set in the composed image display mode (Step S132) image data for one screen of the display panel 330 generated by the processor 100 is transmitted via the interface I/F(A) to the first reception port of the interface circuit 312 of the driver circuit 310. Also, in the composed image display mode, image data in a specific area of the display panel 330 generated by the processor 200 is transmitted via the interface I/F(B) to the second reception port of the interface circuit 312 of the driver circuit 310. With the image data received at the interface circuit 312, the frame memory 314 is sequentially overwritten for storage, and then the image data is read for each sub-pixel for the pixel PIX at the address specified by the LCD controller 316, and is sequentially written as pixel data in the sub-pixel of that pixel PIX of the display panel 330.

Alternatively, image data generated by the processor 200 and sequentially transmitted for each pixel PIX of the display panel 330 via the interface I/F(B) to the interface circuit 312 of the driver circuit 310 is directly written by the LCD controller 316 as pixel data by specifying an address of each pixel PIX.

This causes a voltage in accordance with the pixel data to be applied to the pixel electrode 346 for each sub-pixel of each of the pixels PIX arranged on the display panel 330 and, for example, as depicted in an upper stage of (c) and (e) of FIG. 5, a simple image 334 with a small number of levels of gray scale and low expressive power indicating time or the like such as a mono-color image or segment image is displayed on the entire display area of the display panel 330, based on the image data generated by the processor 100. When this simple image 334 is a still image, an image with a low update frequency of a screen display, or an image for which image rewrite is required only in a specific display area, the display panel 330 as the memory characteristic liquid crystal panel is driven by applying the above-described first display control method and, based on the display characteristics of that display control method, that screen display is retained. Also, when an address of a specific area on the display panel 330 is specified by the LCD controller 316, for example, as depicted in an upper stage of (d) and (f) of FIG. 5, only a simple image 336 of the specific area with the address specified is rewritten in the simple image 334 displayed on the entire display area of the display panel 330, based on the image data generated by the processor 200. That is, a composed image (third image) with the image 334 for one screen and the simple image 336 of the specific area combined is displayed on the display panel 330.

Specifically, as depicted in an upper stage of (c) and (e) of FIG. 5, when the image in the entire display area of the display panel 330 is rewritten, image data for one screen of the display panel 330 including "hour, minute, second" is generated by the processor 100. With this image data written by the driver circuit 310 in the display panel 330 at an image switching timing and, for example, with a cycle of one minute, the image 334 in the entire display area is switched to "12:05:11" and, subsequently, is sequentially rewritten as "12:06:00"→ . . . every minute when "time, minute" changes (in the drawing, refer to "ENTIRE AREA DISPLAY" in the processor 100).

Also, when the image of "second" in which display is changed every one second is rewritten in the image 334 of "hour, minute, second" displayed on the display panel 330, image data in the area indicating "second" is generated by the processor 200. Then, with this image data written by the driver circuit 310 in the display panel 330 with a cycle of one second by specifying an address, as depicted in an upper stage of (d) and (f)) of FIG. 5, the image 336 of "second" is sequentially written every second (in the drawing, refer to "SPECIFIC AREA. DISPLAY" in the processor 200.

In this composed image display mode, as depicted in a lower stage of (c) to (f) of FIG. 5, during a period in which the display device 10 performs entire area display, the processor 100 controls display of the simple images 334 on the display panel 330, and the function regarding display of the display panel 330 in the processor 200 is temporarily suspended or discontinued. That is, during the period of entire area display, only the function regarding display of the display panel 430 in the processor 200 is temporarily suspended, and the operation of the other functions continue without a halt. Also, during a period in which the display device 10 performs specific area display, the processor 200 controls display of the simple images 336 on the display panel 330, and the entire processor 100 or the function regarding display of the display panel 330 in the processor 100 makes a transition to a halt state or a power supply OFF state. This operation of the display device 10 is performed by the processor 100 and the processor 200 cooperating mutually.

This causes a composed image with the image 334 for one screen with a low update frequency of a screen display or few variations (motions) and the simple image 336 of the specific area with a high update frequency of a screen display or many variations (motions) composed to be displayed on the display panel 330 and visually recognized by the user in the composed image display mode. Also, since either one of the processors 100 and 200 is set in a halt state or a temporarily suspended state, consumed power of the display device 10 is reduced. Here, as described above, the display panel 330 has a reflective type panel structure, a simple synthesize image with a small number of levels of gray scale and low expressive power such as time or icon can be vividly displayed while consumed power in the display device 10 is reduced.

Next, in a state in which the display device 10 is set in the composed image display mode, it is monitored by the processor 100 or 200 whether an event of changing the setting of the operation mode has been detected (Step S136), and if not detected, the processors 100 and 200 continue the operation in the composed image display mode. On the other hand, if that event has been detected, the processors 100 and 200 return to Step S104 to control the display form of the image in the display section 300 in accordance with the judgment result of a newly-set operation mode. Here, while the processor 100 is set in a halt state in the composed image display mode during the period of specific area display, by halting only the function regarding display of the display panel 330, operation of the input operating section 120 such as a touch panel by the user can be included as an event of changing the setting of the operation mode of the display device 10.

As with the above-described simple image display mode, this composed image display mode is applied to a case in which, for example, in a state in which the user does not operate the touch panel of a smartwatch or the like, the user glances screen display to check information such as time or a measurement value by a sensor. Also in this case, the processor 100 with high processing capacity is halted as much as possible, and the processor 200 with low processing capacity is mainly used, This can reduce consumed power of the display device 10 to prolong the drive time of the electronic device.

Note that the case has been described in the present embodiment as an example of screen display in the simple image display mode and the composed image display mode in which the image 334 for one screen including hour-minute-second display of a so-called digital timepiece is displayed on the display panel 330 and the image 336 of the specific area for second display in that image 334 is rewritten, as depicted in FIG. 4 and FIG. 5. However, the present invention is not limited to this.

In another example of screen display according to the present invention, for example, as depicted in FIG. 6 (a), in the simple image display mode and the composed image display mode, the image 334 for one screen including display of a hour hand, a minute hand, and a second hand (Hh, Hm, Hs) of an analog timepiece may be displayed every minute, and the image 336 of the specific area displaying the second hand Hs may be rewritten every second, Also in this case, the image 334 for one screen including display of the hour hand, the minute hand, and the second hand (Hh, Hm, Hs) is displayed based on the image data generated by the processor 100 or 200, and the image 336 of the specific area indicating the second hand Hs is based on the image data generated by the processor 200. Here, the image 336 of the specific area indicating the second hand Hs becomes an area moving or changing with respect to the display area of the display panel 330.

That is, the specific area where a simple image is displayed in the present invention may be a fixed area in the display area of the display panel 330 or an area with its position changing as an occasion arises. Also, the size of the specific area is not limited to be sufficiently narrow compared with the entire display area of the display panel 330. As for the specific area applied to the present invention, it is only required to have a display area of a size to the extent that the image can be favorably visually recognized, by the user without disturbance or interruption of the image when the image data generated by the processor 200 with low processing capacity is transmitted via the interface I/F (B) with a slow data transfer rate to the driver circuit 310 for display of an image on the display panel 330.

Also, in still another example of screen display according to the present invention, for example, as depicted in FIG. 6(b) and FIG. 6(c), in the above-described composed image display mode, first, based on the image data generated by the processor 100, the high-functionality image 332 for one screen such as color cartographic image or notification image is displayed on the display panel 330. When this high-functionality image 332 is a still image, an image with a low update frequency of a screen display, or an image for which image rewrite is required only in a specific display area, the display panel 330 is driven by applying the above-described first display control method and, based on the display characteristics of that display control method, that screen display is retained. And, in a state in which the update frequency or variations (motions) of a screen display of the high-functionality image 332 are few, based on the image data generated by the processor 200, images 336 and 338 such as characters, graphics, or marks displayed in the specific area in the high-functionality image 332 and having a small data capacity and requiring continuous rewrite and changes (that is, with a high update frequency) are sequentially rewritten. Here, to the images 336 and 338 displayed in the specific area, for example, characters and/or numerical values indicating a travel distance, pace, and so forth and marks indicating weather information and an operation status are applied.

As described above, in the present embodiment the series of processing operations depicted in the flowchart of FIG. 3 are repeatedly performed. According to this, the following operation specifications of the display device can be achieved. That is, in a state in which the user starts the electronic device with the display device 10 mounted thereon to operate, for example, a touch panel, a button switch, or the like of the input operating sections 120, 220 or input operation by the user has been detected, the operation mode is set by application as the high-functionality image display mode. This causes a high-functionality image such as a color image or moving image displayed on the display panel 330 to be visually recognized by the user. Here, in the high-functionality image display mode, the display function in the processor 200 is set in a halt state (sleep state) or a power supply OFF state.

Then, if the user ends operation on the touch panel, the button switch, or the like or if input operation by the user has not been detected, after a predetermined time (for example, thirty seconds) elapse, the setting of the operation mode is changed by application to the simple image display mode or the composed image display mode. This causes a simple image displayed on the display panel 330 to be visually recognized by the user. In this simple image display mode or composed image display mode, the entire processor 100 or the display function of the processor 100 is set in a halt state or a power supply OFF state continuously in a certain period.

Note, in the present embodiment that while the above-described series of processing operations are performed, the processor 100 and 200 always monitor input operation for discontinuing or ending the processing operation or a change of the operation status and, when detecting the input operation or a status change, forcibly ends the processing operation. Specifically, the processors 100 and 200 detect power supply OFF operation by the user, a decrease in the remaining amount of the battery in the power supply section 600, an occurrence of an anomaly in the application, or the like to forcibly discontinue and end the series of processing operations.

Verification of Operations and Effects

Next, operations and effects in the display device including the display module according to the present embodiment and method for controlling same are specifically described by presenting a comparative example. Here, a display device applied to a general portable-type electronic device (such as a smartwatch or smartphone) is presented as the comparative example.

Figure 7:
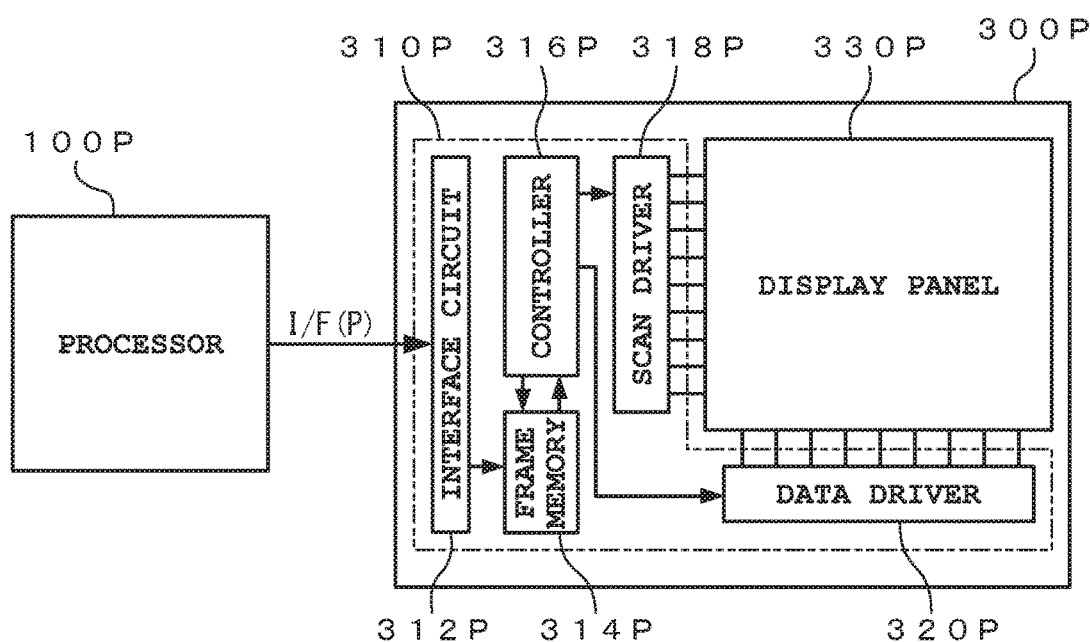
FIG. 7 is a schematic block diagram depicting a comparative example for describing operations and effects of the first embodiment.
Figure 8:
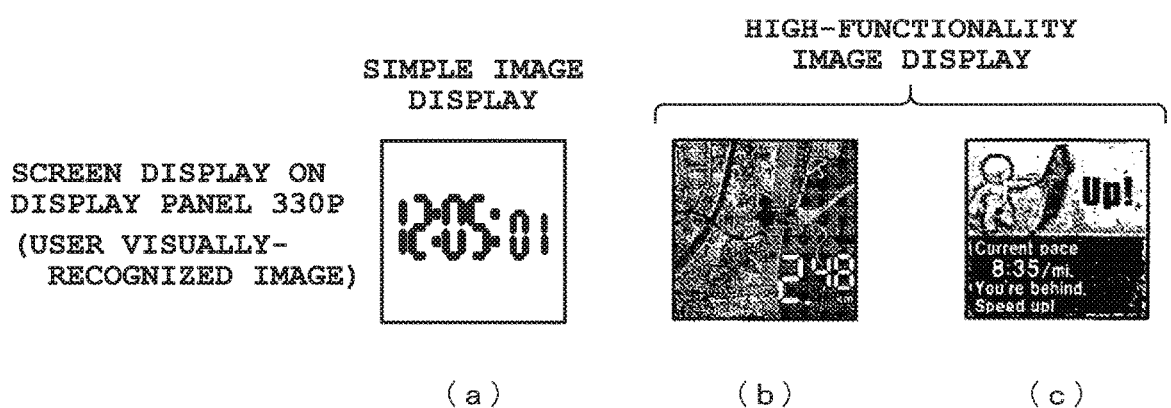
FIG. 8 is a diagram depicting an example of screen display in the comparative example.

FIG. 7 is a schematic block diagram depicting the comparative example for describing operations and effects of the present embodiment, and FIG. 8 is a diagram depicting an example of screen display in the comparative example. Here, to clarify comparison in structure and control method between the present embodiment and the comparative example, a structure equivalent to that of the present embodiment is provided with an equivalent reference character for description.

The display device in the comparative example broadly has a processor 100P and a display section 300P, and the display section 300P includes a display panel 330P and a driver circuit 310P, for example, as depicted in FIG. 7. Here, when the display panel 330P has a transmission-type panel structure, a backlight (light source section) is arranged on a back surface side. As with the above-described embodiment, the driver circuit 310P includes an interface circuit 312P, a frame memory 314P, an LCD controller 316P, a scan driver 318P, a data driver 320P.

In this display device, as with the above-described present embodiment, image data generated by the processor 100P in accordance with the setting of application and input operation by the user is written in the frame memory 314P of the driver circuit 310P, thereby causing a predetermined image to be displayed in an entire display area of the display panel 330P. Then, light is irradiated from the back surface side when the display panel 330P is of a transmission type, and external light incident from a visual field side is reflected. This causes an image displayed on the display panel 330P to be visually recognized by the user.

Here, to cause a high-definition image as described above such as a high-definition color image or smooth moving image to be displayed on the display panel 330P, it is required to apply a arithmetic operation circuit with high processing capacity and high consumed power (high-power, high-performance processor) as the processor 100P. In addition, it is required to connect the processor 100P and the driver circuit 310P via an interface I/F(P) supporting standards with a relatively high data transfer rate such as, for example, MIPI or a parallel interface, Also, as the display panel 330P, a display panel supporting display of high-definition color images, moving images, and so forth and having high display performance is required to be applied.

In this display device, even if a simple image is displayed on the display panel 330P, when an image with a frequent rewrite or change such as time display (for example, second display in the drawing) is included, for example, as depicted in of FIG. 8 (a), it is required to frequently generate image data for the entire display area of the display panel 330P by the processor 100P and repeats operation of writing the image data via the interface I/F(P) in the driver circuit 310P. On the other hand, for example, as depicted in FIG. 8 (b) and FIG. 8 (c), when a high-functionality image such as a color image or moving image is displayed on the display panel 330P, image data is generated by the processor 100P as occasion arises in accordance with an image rewrite or change and is written via the interface I/F(P) in the driver circuit 310P. This requires the processor 100P to be always operated, and does not allow a transition to a power saving state or halt state. Note that, as with the above-described present embodiment (refer to FIG. 3 to FIG. 6), and FIG. 8 (a) to (c) depict an example (simple image, color image) of the screen display in each mode displayed on the display panel 330P when the display mode is switched due to the setting of the application, input operation by the user, or the like.

In this manner, in the display device of the comparative example, since the processor 100 with high processing capacity singly controls screen display in all modes in the display section 300P, the processing load is large and, in particular, when an image with a frequency rewrite or change is displayed, the processor 100P is frequently operated, thereby increasing consumed power. Also, even when a simple image is displayed on the display panel 330P, it is required to use the processor 100P with high processing capacity and the display panel 330P with high display performance, and thus the processing capacity of the processor 100P and the display performance of the display panel 330P become in a surplus state, and the performance of the display section 300P cannot be effectively used.

By contrast, in the present embodiment, two processors 100 and 200 with different processing capacities, and are respectively connected via the individual interfaces I/F(A) and I/F(B) to the driver circuit 310 of the display section 300. Also, the driver circuit 310 has the frame memory 314 incorporated therein, and is configured to sequentially overwrite with image data individually written from the processors 100 and 200. In addition, the display panel 330 is a memory characteristic liquid crystal panel and, with the above-described first display control method applied for driving, pixel data written in each pixel based on the image data generated by the processors 100 and 200 is retained, thereby retaining screen display.

And, with the processors 100 and 200 cooperating mutually, the processors 100 and 200 are properly used in accordance with the operation mode, thereby controlling the display form of the image on the display panel 330. That is, as described above, in the high-functionality image display mode for displaying color images, moving images, and so forth on the display panel 330, the processor 100 is operated, and the display function of the processor 200 is halted. On the other hand, in the simple image display mode for displaying a simple image such as time or an icon on the display panel 330, the processor 200 is operated, and the processor 100 is halted, On the other hand, both of the processors 100 and 200 are operated in the composed image display mode for displaying an image by combining a low update frequency of a screen display with few variations (motions) and an image with a high update frequency of a screen display with many variations (motions).

With this, in the present embodiment a memory characteristic liquid crystal panel is applied as the display panel 330, and the processors 100 and 200 with different processing capacities are properly used in accordance with the operation mode to control display of a high-functionality image, a simple image, and a compose image formed of various image combinations with different update frequencies. This allows various information to be provided in various display forms by using a processor with appropriate processing capacity without impairing user operability. Also in this case, since either one of the processors 100 and 200 can be caused to substantially make a transition to a halt state, consumed power of the display device 10 can be reduced, and the drive time of the electronic device can be improved.

Second Embodiment

Next, a second embodiment of the display device according to the present invention is described in detail with reference to the drawings.

Figure 9:
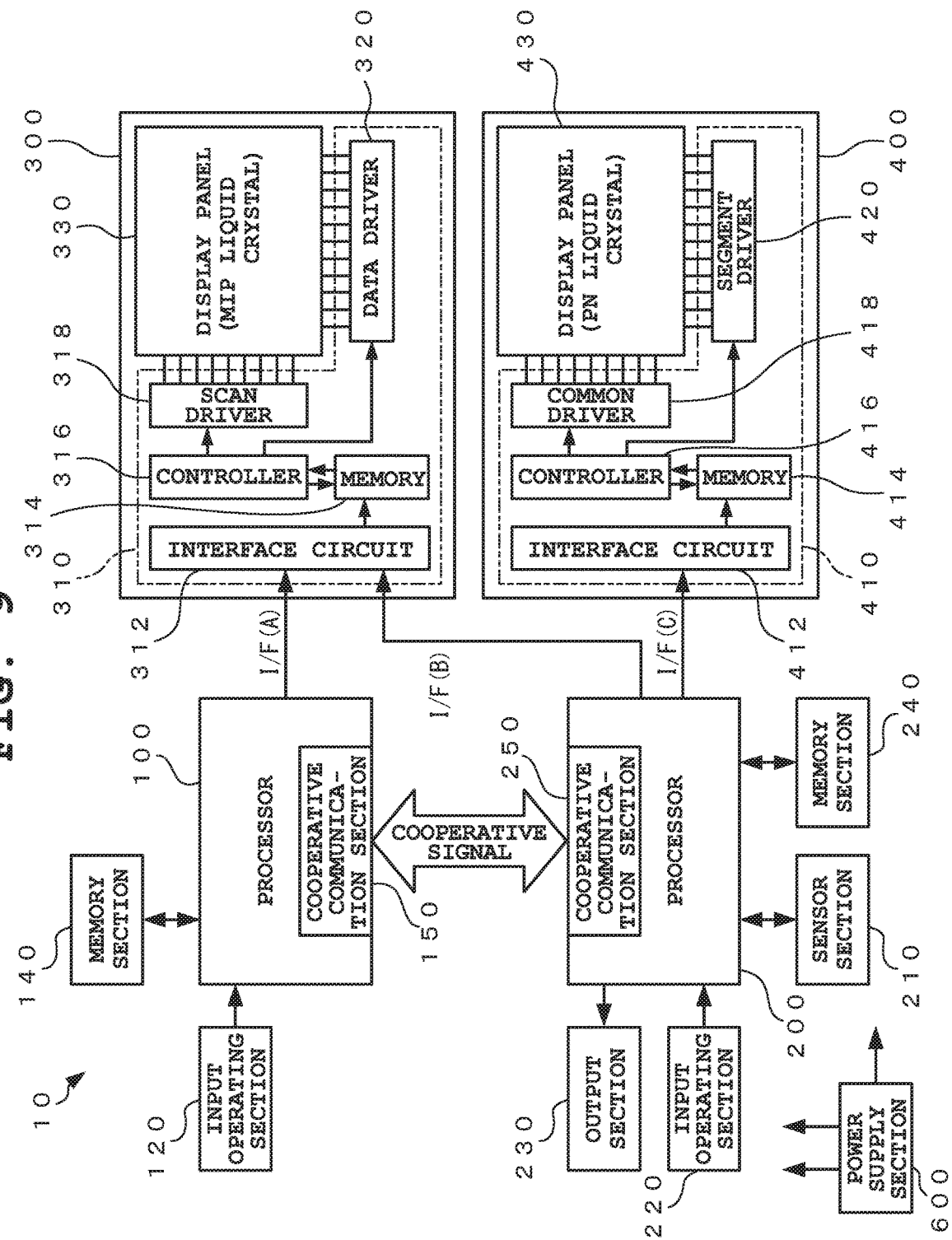
FIG. 9 is a schematic block diagram depicting a second embodiment of the display device according to the present invention.
Figure 10:
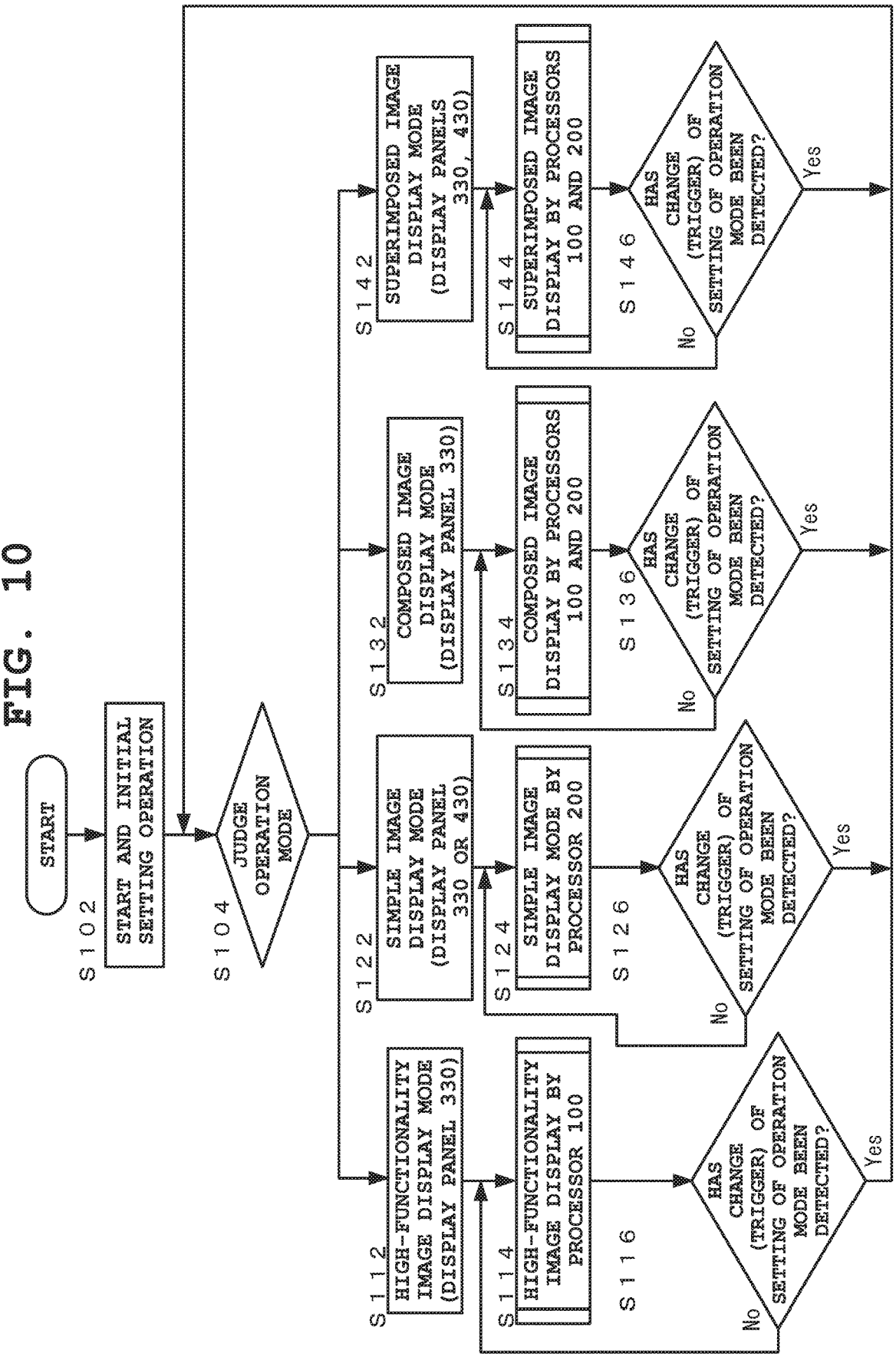
FIG. 10 is a flowchart depicting one example of a display device control method according to the second embodiment.
Figure 11:
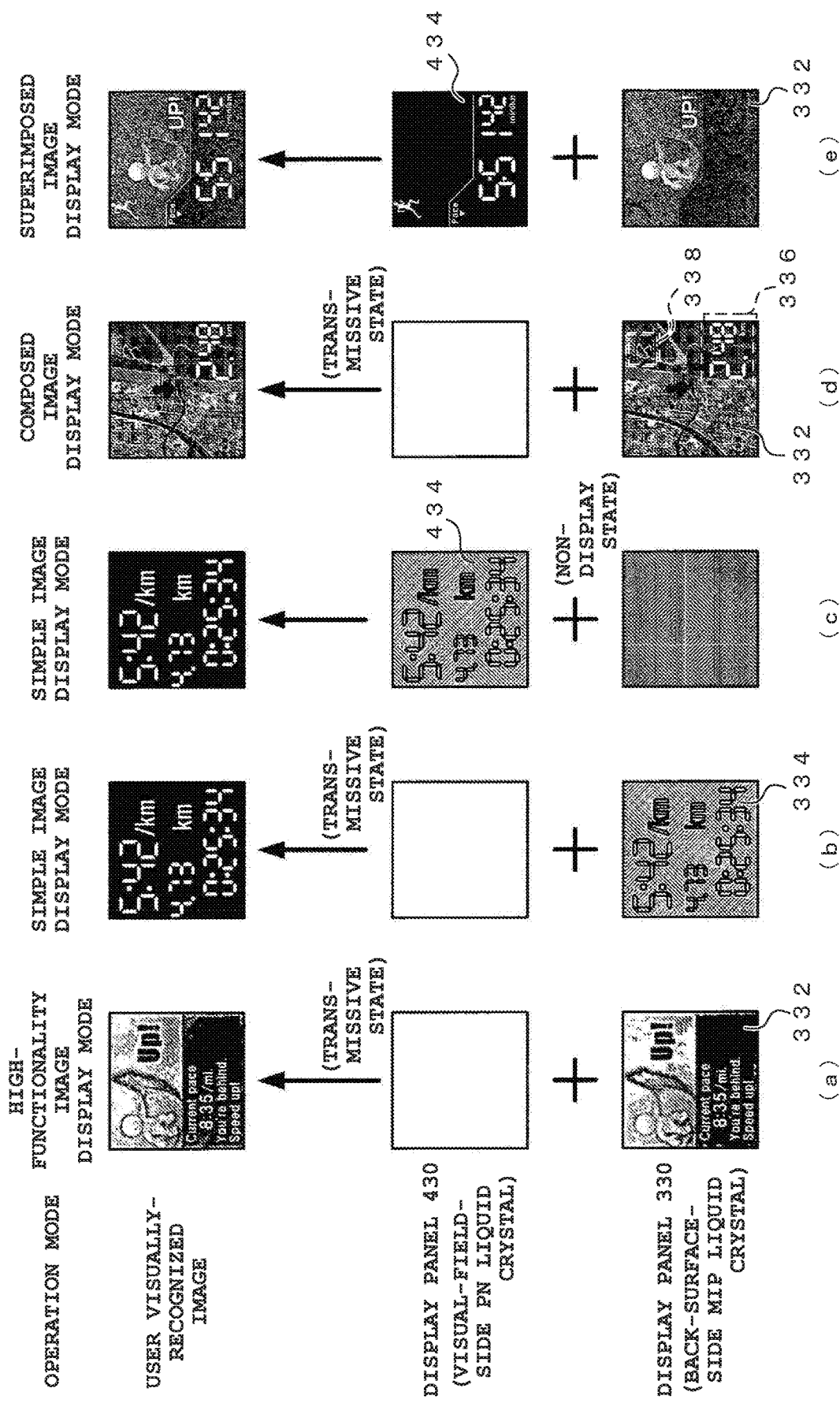
FIG. 11 is a diagram depicting display forms in the display device according to the second embodiment.

FIG. 9 is a schematic block diagram depicting the second embodiment of the display device according to the present invention, FIG. 10 is a flowchart depicting one example of a display device control method according to the present embodiment, and FIG. 11 is a diagram depicting display forms in the display device according to the present embodiment. Here, a structure and a control method equivalent to those of the above-described first embodiment are provided with equivalent reference characters, and their description is simplified.

Display Device

In the first embodiment, the configuration has been described in which an image based on the image data generated by the plurality of processors 100 and 200 is displayed in various display forms on the only display panel 330 to which a memory characteristic liquid crystal panel. The second embodiment is characterized in that a plurality of (here, two) display panels with different display performances are provided to the display section 300, the display status of the display panel 330 is controlled by the processor 100, and the display statuses of the plurality of display panels are controlled by the processor 200, thereby causing an image based on image data generated by the processors 100 and 200 to be displayed in various display forms.

The display device 10 according to the second embodiment schematically has two processors 100 and 200 with different processing capacities, the display section 300 including the display panel 330 to which a memory characteristic liquid crystal panel is applied, and a display section 400 including the display panel 430, for example, as depicted in FIG. 9. As with the above-described first embodiment, the processor 100 is connected via the interface I/F(A) with a relatively rapid data transfer rate such as, for example, MIPI, to the first reception port of the interface circuit 312 of the display section 300. Also, as with the above-described first embodiment, the processor 200 is connected via the interface I/F(B) with a relatively slow data transfer rate such as, for example, SPI, to the second reception port of the interface circuit 312 of the display section 300 and is also separately connected via an interface I/F(C) such as, for example, SPI, to an interface circuit 412 of the display section 400. Here, image data generated by the processor 200 is controlled so as to be selectively transmitted to either one of the display sections 300 and 400 in accordance with the operation mode of the display device 10.

The display section 400 has a driver circuit (or driver IC; second driver circuit) 410 and the display panel 430, as depicted in FIG. 9. As with the above-described first embodiment, the driver circuit 410 includes the interface circuit 412, an image memory (in the drawing, abbreviated as "MEMORY") 414, an LCD controller (in the drawing, abbreviated as "CONTROLLER") 416, a common driver 418, and a segment driver 420.

The interface circuit 412 has a reception port for receiving a predetermined signal including image data from the processor 200 and, as described above, is connected via the interface I/F(C) with a relatively slow data transfer rate such as SPI to the processor 200. The image memory 414 stores image data generated by the processor 200 and transmitted via the above interface circuit 412. The LCD controller 416 reads image data stored in the image memory 414 for each address, and control the common driver 418 and the segment driver 420 to cause display for each screen of the display panel 430 or in a specific area of the display panel 430. Here, when the display panel 430 is a segment liquid crystal panel for displaying a monochrome segment image, the image memory 414 has a function as a retention circuit which retains data for one bit for causing each segment to be turned display (ON) or non-display (OFF).

To the display panel 430, it is possible to apply a liquid crystal panel of a PN (Polymer Network) type or PD (Polymer Dispersed) type capable of monochrome display of a reflective type with relatively high reflectivity and excellent outdoor viewability and also capable of semi-transmissive display and full-transmissive display, and a mono-color or monochrome image, a segment image, or the like based on the image data generated by the processor 200 is displayed by the driver circuit 410 in a simple display form. With this, by displaying an image based on the image data generated by the processor 200 on the display panel 430, a simple image such as a monochrome image or a segment image with relatively high reflectivity and excellent outdoor viewability can be visually recognized by the user.

Also, in the present embodiment, the display panel 430 is arranged on a visual field side of the display panel 330 of the display section 300, and the display area of the display panel 430 and the display area of the display panel 330 are arranged so as to overlap in a planar view. Therefore, as will be described further below, while a simple image such as a monochrome image or segment image is displayed on the display panel 430, as described in the first embodiment, a high-functionality image such as a color image is displayed on the display panel 330 of the display section 300, thereby causing an image with the high-functionality image on the display panel 330 and the simple image on the display panel 430 to be superimposed on top of one another (hereinafter referred to as "superimposed image" for convenience) to be visually recognized by the user. Note in the present embodiment that display forms achieved by the display sections 300 and 400 will be described in detail further below.

Display Device Control Method

In the control method in the display device according to the present embodiment, as operation modes of the display device 10, in addition to the high-functionality image display mode, the simple image display mode, and the composed image display mode described in the above-described first embodiment, a "superimposed image display mode" (fourth display mode) is prepared in advance, for example, as depicted in the flowchart of FIG. 10, and any of the operation modes is set in accordance with the judgment result of the operation mode.

In the high-functionality image display mode (Step S112) in the present embodiment as depicted in a lower stage of FIG. 11(a), as with the above-described first embodiment, image data generated by the processor 100 to the driver circuit 310 of the display section 300 to cause the high-functionality image 332 to be displayed on the display panel 330 (Step S114). Also, with the processors 100 and 200 cooperating mutually, transmission of image data from the processor 200 to the display section 300 or 400 is stopped. Also, as depicted in a middle stage of FIG. 11 (a), the display panel 430 arranged on a visual field side is controlled by the processor 200 in a transmissive state. Here, as the display panel 430, as described above, when a PN type liquid crystal panel is applied, it is required to apply a predetermined voltage to the display panel 430 to achieve a transmissive state. In this case, however, the display panel 430 is set in a non-display state in which no image is displayed, thereby reducing the processing load of the processor 200 compared with a case in which an image is displayed on the display panel 430. With this, as depicted in an upper stage of FIG. 11 (a), the high-functionality image 332 displayed on the display panel 330 on a back surface side is visually recognized by the user as being transmitted through the display panel 430 on the visual field side.

Also, in the simple image display mode (Step S122), as depicted in a lower stage of FIG. 11 (b), as with the above-described first embodiment, image data generated by the processor 200 is transmitted to the driver circuit 310 of the display section 300, thereby causing the simple image 334 to be displayed on the display panel 330 (Step S124). Also, with the processors 100 and 200 cooperating mutually, the entire processor 100 or the display function in the processor 100 is set in a halt state, and transmission of image data from the processor 100 to the display section 300 is stopped. Also at this time, as depicted in a middle stage of FIG. 11 (b), the display panel 430 arranged on the visual field side is set by the processor 200 in a non-display state in which no image is displayed and in a transmissive state. With this, as depicted in an upper stage of FIG. 11 (b), the simple image 334 displayed on the display panel 330 on the back surface side is visually recognized by the user as being transmitted through the display panel 430 on the visual field side.

Note that in the display device 10 according to the present embodiment, the following display form can be applied as the simple image display mode. That is, as depicted in a middle stage of FIG. 11 (c), image data generated by the processor 200 is transmitted to the driver circuit 410 of the display section 400, thereby causing a simple image 434 to be displayed on the display panel 430. Also, with the processors 100 and 200 cooperating mutually, the entire processor 100 or the display function in the processor 100 is set in a halt state, and transmission of image data from the processor 100 to the display section 300 is stopped. As depicted in a middle stage of FIG. 11 (c), the display panel 330 arranged on the back surface side is set in a non-display state in which no image is displayed. With this, as depicted in an upper stage of FIG. 11 (c), the simple image 334 displayed on the display panel 430 on the back surface side is visually recognized by the user.

Also, in the composed image display mode (Step S132) as depicted in a lower stage of FIG. 11 (d) as with the above-described first embodiment, image data generated by the processor 100 is transmitted to the driver circuit 310 of the display section 300, thereby causing the high-functionality image 332 for one screen to be displayed on the display panel 330. And, in this state, image data generated by the processor 200 is transmitted to the driver circuit 310 of the display section 300, thereby causing the simple images 336 and 338 to be displayed in a specific area on the display panel 330 (Step S134). Here, in a state in which the high-functionality image 332 displayed on the display panel 330 is not rewritten or changed, that screen display is retained based on the display characteristics when the display panel 330 as the memory characteristic liquid crystal panel is driven by the above-described first display control method. Thus, with the processors 100 and 200 cooperating mutually, the entire processor 100 or the display function in the processor 100 is set in a halt state, and transmission of image data from the processor 100 to the display section 300 is stopped. Also, pixel data is written in the pixel PIX in a specific area on the display panel 330 by specifying an address by the processor 200, thereby causing the simple images 336 and 338 displayed in that specific area to be rewritten. Also at this time, as depicted in a middle stage of FIG. 11 (d), the display panel 430 arranged on the visual field side is set in a non-display state in which no image is displayed and in a transmissive state. With this, as depicted in an upper stage of FIG. 11 (d), a composed image with the high-functionality image 332 and the simple images 336 and 338 combined displayed on the display panel 330 on the back surface side is visually recognized by the user as being transmitted through the display panel 430 on the visual field side.

And, in the composed image display mode (Step S142), as depicted in a lower stage of FIG. 11 (e), image data generated by the processor 100 is transmitted to the driver circuit 310 of the display section 300, thereby causing the high-functionality image 332 for one screen to be displayed on the display panel 330. Also as depicted in a middle stage of FIG. 11 (e), image data generated by the processor 200 is transmitted to the driver circuit 410 of the display section 400, thereby causing the simple image 434 to be displayed in a specific area on the display panel 430 (Step S144). Here, in a state in which the high-functionality image 332 displayed on the display panel 330 is riot rewritten or changed, as with the above-described composed image display mode, that screen display is retained based on the display characteristics in the first display control method. Thus, with the processors 100 and 200 cooperating mutually, the entire processor 100 or the display function in the processor 100 is set in a halt state, and transmission of image data from the processor 100 to the display section 300 is stopped. Also, pixel data is written in the pixel PIX in a specific area on the display panel 430 by specifying an address by the processor 200, thereby causing the simple image 434 displayed in that specific area to be rewritten. With this, as depicted in an upper stage of FIG. 11 (e) a superimposed image with the simple image 434 displayed on the display panel 430 on the visual field side and the high-functionality image 332 displayed on the display panel 330 on the back surface side superimposed on top of one another is visually recognized by the user.

Next, as depicted in Step S146 of the flowchart of FIG. 10, by the processor 100 or 200, until an event of changing the setting of the operation mode is detected, the operation in the above superimposed image display mode continues. When that event is detected, the processing returns to Step S104 to control the display form of the image in the display sections 300 and 400 in accordance with the judgment result of a newly-set operation mode.

In this manner, in the present embodiment, the display panel 430 where a simple image based on the image data generated by the processor 200 is displayed is arranged on the visual field side of the display panel 330 as a memory-characteristic liquid crystal panel. And, the processors 100 and 200 having different processing capacities and the display panels 330 and 430 having different display performances are properly used in accordance with the operation mode to control display of a high-functionality image, a simple image, a composed image, and a superimposed image formed of superposition of various images with different update frequencies. This allows various information to be provided in various display forms by using a processor with appropriate processing capacity and a display panel with appropriate display performance without impairing user operability. Also in this case, since either one of the processors 100 and 200 can be caused to substantially make a transition to a halt state, consumed power of the display device 10 can be reduced, and the drive time of the electronic device can be improved.

Modification Example

Next, a modification example in each of the above-described embodiments is described.

FIG. 12 is a schematic block diagram depicting a modification example in each of the above-described embodiments. Here, a structure equivalent to that of each of the above-described embodiments is provided with an equivalent reference character, and its representation is simplified for description.

In each of the above-described embodiments, the case has been described in which a reflective type memory-characteristic liquid crystal panel is applied as the display panel 330 and, with external light incident from the visual field side, an image displayed on the display panels 330 and 430 is visually recognized by the user. However, the present invention is not limited to this. That is, in the display panel 330 with a reflective type panel structure, user can favorably visually recognize an image under a relatively bright environment such as outdoors 9 but visual recognition of screen display may difficult under a dark environment Thus, to the display device 10, a configuration including a light source section 500 such as a front light or edge light of the display panel 330 can be applied, for example, as depicted in FIG. 12 (a) and FIG. 12 (b). In this light source section 500, a light-emitting status is controlled by the processors 100 and 200 detecting operation of the input operating sections 120 and 220 by the user. According to this, even under a dark environment, by the user causing the front light or edge light of the light source section 500 to be lit, the image displayed on the display panels 330 and 430 can be favorably visually recognized.

Here, as described above, in the display device according to the present invention, the processor 100 may be set in a halt state in accordance with the operation mode, and thus the light-emitting status of the light source section 500 is preferably controlled by the processor 200 in which functions other than the display function can always be operated irrespectively of the operation mode. According to this, the processing load in the processor 100 can be decreased, and consumed power in the halt sate can further be reduced.

Also, in each of the above-described embodiments, the case has been described in which a reflective type memory characteristic liquid crystal panel is applied as the display panel 330. However, the present invention is not limited to this. That is, a configuration can be applied in which a transmissive type memory characteristic liquid crystal panel is applied as the display panel 330 and, furthermore, the light source section 500 as a backlight is arranged on its back surface side. The display device 10 in this case has a configuration equivalent to those of FIG. 12 (a) and FIG. 12(b) and the light-emitting status of the light source section 500 is controlled by the processor 100 or 200 in accordance with the operation mode of the display device 10. Here, in a state in which an image is displayed on the display panel 330 by the processor 100, the light source section 500 is controlled by the processor 100. In a state in which the processor 100 is set in a halt state, the light source section 500 is controlled by the processor 200. This control of the light source section 500 is performed by the processor 100 and the processor 200 cooperating mutually. According to this, in a state in which a high-functionality image and/or simple image is displayed on the display panels 330 and/or 430, the backlight of the light source section 500 is lit up, thereby allowing the user to visually recognize a vivid image with high luminance.

Also, in each of the above-described embodiments, the configuration has been described in which the processor 100 with high processing capacity and the display section 300 are connected via the interface I/F(A) with rapid data transfer rate, and the processor 200 with relatively low processing capacity and the display section 300 are connected via the interface I/F(B) with slow data transfer rate. However, the present invention is not limited to this. For example, the processor 100 and the processor 200 may have equivalent processing capacity, and the interface I/F(A) and the interface I/F(B) may have an equivalent data transfer rate. In this case, the processor 100 is operated at a high operation frequency, image data with a large data capacity is generated and transmitted with a rapid transfer rate to the display section 300, and a high-functionality image is displayed on the display panel 330. On the other hand, the processor 200 is operated at a low operation frequency, image data with a small data capacity is generated and transmitted with a slow transfer rate to the display section 300, and a simple image is displayed on the display panel 330. Also in these configuration and control method, as with each of the above-described embodiments, the processors 100 and 200 are used appropriately according to an operation mode; thereby power consumption of the display device 10 can be suppressed while being able to provide various types of information in various display forms without impairing user operability, Also, in the above-described second embodiment, the case has been described in which, as the display panel 430 arranged on the visual field side of the display panel 330, a PN-type or PD type liquid crystal panel with relatively high reflectivity and excellent outdoor viewability is applied. However, the present invention is not limited to this. That is, it is possible to apply a display panel of another type having display capacity equivalent to that of the above-described PN type or PD type liquid crystal panel. Specifically, for example, a transparent organic EL panel, a display panel for use in electronic paper, or the like can be favorably applied. Here, when a transparent organic EL panel is applied as the display panel 430, unlike the above-described PN type liquid crystal panel, it is not required to apply a voltage to the display panel 430 to achieve a transmissive state. Thus, in each of the display modes depicted in FIGS. 11 (a) (b) and (d), the display function of the display panel 430 in the processor 200 can be set in a halt state or a power supply OFF state, and consumed power of the display device 10 can be reduced.

In the foregoing, while several embodiments of the present invention have been described, the present invention is not limited to the above-described embodiments and includes the invention described in the claims and its equivalent scope.

DESCRIPTION OF REFERENCE NUMERALS 10 display device
100, 200 processor
120, 220 input operating section
150, 250 cooperative communication section
210 sensor section
300, 400 display section
310, 410 driver circuit
312, 412 interface circuit
314 frame memory
330, 430 display panel
414 image memory
500 light source section
600 power supply section
I/F(A)-I/F(C) interface

The invention claimed is:
1. A display module comprising:
a display comprising a plurality of pixels, wherein each pixel comprises a plurality of sub-pixels, wherein each sub-pixel has (i) a first display circuit that includes an in-pixel memory, a pixel electrode, and a display voltage supply circuit that applies a voltage to the pixel electrode in accordance with pixel data stored in the in-pixel memory of that sub-pixel, and (ii) a second display circuit that does not include an in-pixel memory, wherein the sub-pixel is selectively controlled to display an image via the first display circuit or via the second display circuit, and wherein the in-pixel memory comprises a RAM that is provided in the first display circuit of each sub-pixel; and
a driver circuit which drives the display,
wherein:
the driver circuit comprises a first reception port which is operable to receive first image data and a second reception port which is operable to receive second image data,
in a first display mode, the driver circuit writes pixel data based on the first image data received via the first reception port in the in-pixel memories of a plurality of the pixels, or outputs the pixel data to the second display circuits of a plurality of the pixels, thereby causing the first image data received via the first reception port to be displayed on the display,
in a second display mode, the driver circuit stops reception from the first reception port, and writes pixel data based on the second image data received via the second reception port in the in-pixel memories of a plurality of the pixels, thereby causing the second image data received via the second reception port to be displayed on the display, and
in a third display mode, the driver circuit writes pixel data based on the first image data received via the first reception port in the in-pixel memories of a plurality of the pixels and writes pixel data based on the second image data differing from the first image data and received via the second reception port in the in-pixel memories of a plurality of the pixels, thereby changing display of the display.

2. The display module according to claim 1, wherein the driver circuit, in the third display mode, in a state of writing the pixel data based on the first image data received via the first reception port in the in-pixel memories of a plurality of the pixels and causing a first image based on the first image data to be displayed on the display, writes the pixel data based on the second image data received via the second reception port in the in-pixel memories of a plurality of the pixels including at least some of the in-pixel memories in which the pixel data based on the first image data was written, and causes part of the first image to be rewritten with a second image based on the second image data.

3. The display module according to claim 1, wherein:
the first reception port has a first communication standard supporting a first transfer rate when receiving image data;
the second reception port has a second communication standard supporting a second transfer rate when receiving image data, the second transfer rate being slower than the first transfer rate; and
the first communication standard and the second communication standard are different from each other.

4. The display module according to claim 1, wherein the driver circuit causes the first image data received via the first reception port or the second image data received via the second reception port to be displayed on the display, irrespectively of pixel data retained in each of a plurality of the in-pixel memories, by outputting pixel data based on the first image data received via the first reception port or the second image data received via the second reception port to the second display circuits of a plurality of the pixels.

5. The display module according to claim 1, wherein the driver circuit includes a frame memory, and causes image data stored in the frame memory to be displayed on the display, irrespectively of pixel data retained in each of a plurality of the in-pixel memories, by outputting pixel data based on the image data stored in the frame memory to the second display circuits of a plurality of the pixels.

6. The display module according to claim 5, wherein: the driver circuit:
in the first display mode, changes display of the display by reading pixel data based on image data retained in the frame memory for each of the sub-pixels of a plurality of the pixels and writing the pixel data in the in-pixel memory for each of the sub-pixels, or by outputting the pixel data to the second display circuits of a plurality of the pixels, and
in the second display mode, changes display of the display by reading pixel data based on image data retained in the frame memory for each of the sub-pixels of a plurality of the pixels and writing the pixel data in the in-pixel memory for each of the sub-pixels, or by directly rewriting the pixel data based on the second image data received via the second reception port in the in-pixel memory for each of the sub-pixels.

7. The display module according to claim 6, wherein the driver circuit:
in the first display mode, writes pixel data formed of a predetermined number of a plurality of bits in each of the sub-pixels of the plurality of pixels to change display of the display; and
in the second display mode, writes pixel data formed of a number of bits smaller than the plurality of bits or one bit in each of the sub-pixels of the plurality of pixels to change display of the display.

8. The display module according to claim 7, wherein:
in the first display mode, the image data is configured of a plurality of bits per said sub-pixel of each color of R (red), G (green), and B (blue) configuring the pixels; and
in the second display mode, the image data is configured of one bit per said sub-pixel of each color of R (red) G (green), and B (blue).

9. The display module according to claim 1, wherein:
the driver circuit comprises a frame memory which retains the first image data received via the first reception port or the second image data received via the second reception port;
in the first display mode, based on the first image data received via the first reception port and retained in the frame memory, the driver circuit changes display of the display by rewriting pixel data written in the in-pixel memories of a plurality of the pixels, or by outputting pixel data to the second display circuits of a plurality of the pixels; and
in the second display mode, the driver circuit changes display of the display (i) by rewriting pixel data written in the plurality of in-pixel memories based on the second image data received via the second reception port and retained in the frame memory, or (ii) by directly rewriting the pixel data in the plurality of in-pixel memories based on the second image data received via the second reception port.

10. The display module according to claim 1, wherein:
in the first display mode, in a case in which the first image data is image data of a first type including a still image or an image with a low update frequency of a screen display, the driver circuit writes the pixel data in the in-pixel memories of the first display circuits of the plurality of pixels, and
in the first display mode, in a case in which the first image data is image data of a second type including an image with a high update frequency of a screen display or many variations as compared to image data of the first type, the driver circuit outputs the pixel data to the second display circuits instead of the first display circuits.

11. The display module according to claim 1, wherein:
the pixel electrode is provided individually for each sub-pixel, and
in each sub-pixel:
the second display circuit is configured to apply a voltage to the pixel electrode in accordance with pixel data supplied via a data line, without storing the pixel data in the in-pixel memory of the first display circuit and irrespective of any pixel data already stored in the in-pixel memory of the first display circuit, and
the pixel electrode provided individually for the sub-pixel is commonly used by the first display circuit and the second display circuit of that sub-pixel such that the voltage is applied to the pixel electrode via a selected one of the first display circuit and the second display circuit.

12. The display module according to claim 1, wherein:
the pixel electrode is provided individually for each sub-pixel, and
in each sub-pixel:
the in-pixel memory of the first display circuit is connected to a data line and stores pixel data supplied via the data line,
the second display circuit includes a pixel transistor that is connected to the data line and that is configured to apply a voltage to the pixel electrode in accordance with pixel data supplied via the data line, without storing the pixel data in the in-pixel memory of the first display circuit and irrespective of any pixel data already stored in the in-pixel memory of the first display circuit, and
the pixel electrode provided individually for the sub-pixel is commonly used by the first display circuit and the second display circuit of that sub-pixel such that, when the sub-pixel is selectively controlled to display an image via the first display circuit, the voltage is applied to the pixel electrode by the display voltage supply circuit of the first display circuit, and when the sub-pixel is selectively controlled to display an image via the second display circuit, the voltage is applied to the pixel electrode by the pixel transistor of the second display circuit.

13. A display device comprising:
a first processor which is operable to generate first image data;
a second processor which is operable to generate second image data;
a display comprising a plurality of pixels, wherein each pixel comprises a plurality of sub-pixels, wherein each sub-pixel has (i) a first display circuit that includes an in-pixel memory, a pixel electrode, and a display voltage supply circuit that applies a voltage to the pixel electrode in accordance with pixel data stored in the in-pixel memory of that sub-pixel, and (ii) a second display circuit that does not include an in-pixel memory, wherein the sub-pixel is selectively controlled to display an image via the first display circuit or via the second display circuit, and wherein the in-pixel memory comprises a RAM that is provided in the first display circuit of each sub-pixel; and
a driver circuit which drives the display,
wherein:
the driver circuit comprises a first reception port which is operable to receive the first image data from the first processor and a second reception port which is operable to receive the second image data from the second processor,
in a first display mode, in which the first processor and the second processor cooperate mutually by transmitting and receiving a predetermined cooperative signal respectively via a cooperative communication section to control the driver circuit, the driver circuit writes pixel data based on the first image data received from the first processor via the first reception port in the in-pixel memories of a plurality of the pixels, or outputs the pixel data to the second display circuits of a plurality of the pixels, thereby causing the first image data received via the first reception port to be displayed on the display, in a second display mode, in which the first processor is set in a halt state, the driver circuit writes pixel data based on the second image data received from the second processor via the second reception port in the in-pixel memories of a plurality of the pixels, without reception of the first image data from the first processor via the first reception port, thereby causing the second image data received from the second processor via the second reception port to be displayed on the display, and in a third display mode, in which the first processor and the second processor cooperate mutually, the driver circuit writes pixel data based on the first image data received from the first processor via the first reception port in the in-pixel memories of a plurality of the pixels and writes pixel data based on the second image data differing from the first image data and received from the second processor via the second reception port in the in-pixel memories of a plurality of the pixels, thereby changing display of the display.

14. The display device according to claim 13, wherein, in the second display mode and the third display mode, the second processor controls the driver circuit to change display of the display by directly rewriting pixel data in the in-pixel memories of a plurality of the pixels via the second reception port.

15. The display device according to claim 13, wherein:
on a visual field side of the display, another display is provided in which a display status is controlled based on the second image data received by the second reception port, said another display being capable of transmissive display, and
the driver circuit causes an image based on the second image data received by the second reception port to be displayed on said another display in a state in which an image based on the first image data received by the first reception port is displayed on the display.

16. The display device according to claim 13, wherein:
the pixel electrode is provided individually for each sub-pixel, and
in each sub-pixel:
the second display circuit is configured to apply a voltage to the pixel electrode in accordance with pixel data supplied via a data line, without storing the pixel data in the in-pixel memory of the first display circuit and irrespective of any pixel data already stored in the in-pixel memory of the first display circuit, and
the pixel electrode provided individually for the sub-pixel is commonly used by the first display circuit and the second display circuit of that sub-pixel such that the voltage is applied to the pixel electrode via a selected one of the first display circuit and the second display circuit.

17. A display device comprising:
a display comprising a plurality of pixels, wherein each pixel comprises a plurality of sub-pixels, wherein each sub-pixel has (i) a first display circuit that includes an in-pixel memory, a pixel electrode, and a display voltage supply circuit that applies a voltage to the pixel electrode in accordance with pixel data stored in the in-pixel memory of that sub-pixel, and (ii) a second display circuit that does not include an in-pixel memory, wherein the sub-pixel is selectively controlled to display an image via the first display circuit or via the second display circuit, and wherein the in-pixel memory comprises a RAM that is provided in the first display circuit of each sub-pixel;
a driver circuit which drives the display, wherein the driver circuit comprises a first reception port which is operable to receive first image data and a second reception port which is operable to receive second image data;
a frame memory which stores image data to be displayed on the display;
a first processor which controls at least a first display mode; and
a second processor which controls at least a second display mode,
in the first display mode, the first processor rewrites the image data in the frame memory via the first reception port, and the driver circuit writes pixel data based on the first image data received via the first reception port in the in-pixel memories of a plurality of the pixels, or outputs the pixel data to the second display circuits of a plurality of the pixels, thereby causing the first image data received via the first reception port to be displayed on the display,
in the second display mode, the driver circuit stops reception from the first reception port, and writes pixel data based on the second image data received via the second reception port in the in-pixel memories of a plurality of the pixels, thereby causing the second image data received via the second reception port to be displayed on the display, whereby the second processor rewrites display of the display, and
in a third display mode, the driver circuit writes pixel data based on the first image data received via the first reception port in the in-pixel memories of a plurality of the pixels and writes pixel data based on the second image data differing from the first image data and received via the second reception port in the in-pixel memories of a plurality of the pixels, thereby changing display of the display.

18. The display device according to claim 17, wherein, in the second display mode and the third display mode, the second processor changes display of the display by rewriting the image data in the frame memory and by the driver circuit rewriting, based on the image data in the frame memory, pixel data written in the in-pixel memories of a plurality of the pixels.

19. The display device according to claim 17, wherein:
the pixel electrode is provided individually for each sub-pixel, and
in each sub-pixel:
the second display circuit is configured to apply a voltage to the pixel electrode in accordance with pixel data supplied via a data line, without storing the pixel data in the in-pixel memory of the first display circuit and irrespective of any pixel data already stored in the in-pixel memory of the first display circuit, and
the pixel electrode provided individually for the sub-pixel is commonly used by the first display circuit and the second display circuit of that sub-pixel such that the voltage is applied to the pixel electrode via a selected one of the first display circuit and the second display circuit.

20. A display device control method for a display module comprising a display comprising a plurality of pixels, wherein each pixel comprises a plurality of sub-pixels, wherein each sub-pixel has (i) a first display circuit that includes an in-pixel memory, a pixel electrode, and a display voltage supply circuit that applies a voltage to the pixel electrode in accordance with pixel data stored in the in-pixel memory of that sub-pixel, and (ii) a second display circuit that does not include an in-pixel memory, wherein the sub-pixel is selectively controlled to display an image via the first display circuit or via the second display circuit, and wherein the in-pixel memory comprises a RAM that is provided in the first display circuit of each sub-pixel, the method comprising:
selectively generating first image data by a first processor;
selectively generating second image data by a second processor; and
in a first display mode, in which the first processor and the second processor cooperate mutually by transmitting and receiving a predetermined cooperative signal respectively via a cooperative communication section, writing pixel data based on the first image data generated by the first processor in the in-pixel memories of a plurality of the pixels of the display, or outputting the pixel data to the second display circuits of a plurality of the pixels of the display, thereby causing the first image data generated by the first processor to be displayed on the display,
in a second display mode in which the first processor is set in a halt state, writing pixel data based on the second image data generated by the second processor in the in-pixel memories of a plurality of the pixels, thereby causing the second image data generated by the second processor to be displayed on the display, and
in a third display mode, in which the first processor and the second processor cooperate mutually, writing pixel data based on the first image data generated by the first processor in the in-pixel memories of a plurality of the pixels, and writing pixel data based on the second image data differing from the first image data and generated by the second processor in the in-pixel memories of a plurality of the pixels, thereby changing display of the display.

* * * * *